US008284286B2

(12) United States Patent
Mabuchi

(10) Patent No.: US 8,284,286 B2
(45) Date of Patent: Oct. 9, 2012

(54) SOLID STATE IMAGE SENSING DEVICE HAVING LOGARITHMIC SIGNAL OUTPUT WHEN IMAGE SENSOR IS SATURATED

(75) Inventor: Keiji Mabuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 546 days.

(21) Appl. No.: 10/481,973

(22) PCT Filed: Jul. 3, 2002

(86) PCT No.: PCT/JP02/06736
§ 371 (c)(1),
(2), (4) Date: Jul. 19, 2004

(87) PCT Pub. No.: WO03/005707
PCT Pub. Date: Jan. 16, 2003

(65) Prior Publication Data
US 2004/0239791 A1 Dec. 2, 2004

(30) Foreign Application Priority Data

Jul. 3, 2001 (JP) ................................. 2001-201601
Sep. 12, 2001 (JP) ................................. 2001-276529
Sep. 20, 2001 (JP) ................................. 2001-286457

(51) Int. Cl.
*H04N 3/14* (2006.01)
*H01L 27/00* (2006.01)

(52) U.S. Cl. ....................... 348/308; 348/310; 250/208.1

(58) Field of Classification Search .................. 348/294, 348/308, 310
See application file for complete search history.

(56) References Cited

U.S. PATENT DOCUMENTS 5,892,541 A * 4/1999 Merrill ........................... 348/302

(Continued)

FOREIGN PATENT DOCUMENTS

EP 1096790 A 5/2001
JP 2000-23040 A 1/2000

OTHER PUBLICATIONS

S. Decker et al., "A 256 × 256 CMOS Imaging Array with Wide Dynamic Range Pixels and Column-Parallel Digital Output", IEEE Journal of Solid-State Circuits, vol. 33, No. 12, Dec. 1998.*

(Continued)

*Primary Examiner* — Ngoc-Yen Vu
(74) *Attorney, Agent, or Firm* — Robert J. Depke; Rockey, Depke & Lyons, LLC

(57) ABSTRACT

A solid-state image sensing apparatus with a wide dynamic range, and a high performance, and further, a small size, and a low cost and its driving method are provided. A timing generator, before it supplies a reset pulse (134) to a reset gate (128), has a sample hold circuit (2) held an output voltage of a buffer circuit (130). In this reset stage, in case that the amount of incident light to a photo diode (122) is large, electric charges which the photo diode (122) generated overflow from the photo diode (122) and flow into an FD part (123), and further, overflow also in the FD part (124) and flow out to an electric source Vdd. At this time, a voltage of the FD part (124) is determined by a size of a current due to electric charges which flow out to the electric source, but since a current flowing in a channel is small and the reset gate (128) operates in a sub-threshold region, a voltage of the FD part (124) becomes a value which corresponded to logarithm of a current value. Thus, a voltage which the sample hold circuit (2) holds becomes a value which corresponded to logarithm of the amount of light.

21 Claims, 26 Drawing Sheets

U.S. PATENT DOCUMENTS

| | | | | |
|---|---|---|---|---|
| 6,307,195 B1 * | 10/2001 | Guidash | .................... | 250/208.1 |
| 6,486,504 B1 * | 11/2002 | Guidash | ..................... | 257/222 |
| 6,680,498 B2 * | 1/2004 | Guidash | ..................... | 257/222 |
| 6,710,804 B1 * | 3/2004 | Guidash | ..................... | 348/302 |
| 7,046,238 B2 * | 5/2006 | Mabuchi | ..................... | 345/204 |
| 7,586,487 B2 * | 9/2009 | Mabuchi | ..................... | 345/204 |

OTHER PUBLICATIONS

S. Kavadias et al., "A Logarithmic Response CMOS Image Sensor with On-Chip Calibration", IEEE Journal of Solid-State Circuits, vol. 35, No. 8, Aug. 2000.*

* cited by examiner

(12)  US 8,284,286 B2

SOLID STATE IMAGE SENSING DEVICE HAVING LOGARITHMIC SIGNAL OUTPUT WHEN IMAGE SENSOR IS SATURATED

This application claims priority to Japanese Patent Application Numbers JP2001-201601, filed Jul. 3, 2001, JP2001-276529, filed Sep. 12, 2001, and JP2001-286457, filed Sep. 20, 2001, which are incorporated herein by reference.

TECHNICAL FIELD

This invention relates to a solid-state image sensing apparatus, and in particular, relates to a solid-state image sensing apparatus in which expansion of a dynamic range in detecting light was realized.

BACKGROUND TECHNOLOGY

FIG. 28 is a block diagram showing a conventional solid-state image sensing apparatus, FIG. 29 is a circuit diagram showing a periphery of 1 pixel part which configures the solid-state image sensing apparatus of FIG. 28, and FIG. 30 is a timing chart showing operations of the circuit which was shown in FIG. 29.

A solid-state image sensing apparatus 102 which was shown in FIG. 28 is concretely a CMOS light sensor, and includes a pixel region 104 which was formed on a semiconductor substrate, V selection means 106, H selection means 108, a timing generator 110 (TG), a signal processing part 112, a constant current part 114A and so on. In the pixel region 104, a lot of pixels are disposed in a matrix shape, and it is configured such that electric signals which were generated due to each pixel's detecting light, on the basis of a timing pulse from the timing generator 110, are sequentially selected by the V selection means 106 and the H selection means 108, and outputted from a horizontal signal line 116 through an output part 118.

A pixel 120, as shown in FIG. 29, is configured by including a photo diode 122, a floating diffusion part 124 (FD part 124) which generates a voltage of a size which corresponded to an amount of electrical charges, a transfer gate 126 which connects the photo diode 122 to the FD part 124 when a transfer pulse was supplied, a reset gate 128 which connects the FD part 124 to an electric source Vdd when a reset pulse was supplied, and a buffer circuit 130 which outputs a voltage of the FD part 124.

The photo diode 122 is configured such that an anode is connected to ground, and a cathode is connected to a source of a MOSFET (MOS Field Effect Transistor) of N type which configures the transfer gate 126. A drain of the same MOSFET is connected to the FD part 124, and also, to a gate, a transfer pulse 132 is supplied from the timing generator 110. The reset gate 128 is also configured by a MOSSFET of N type, and its source is connected to the FD part 124, and a drain is connected to the electric source Vdd, respectively, and to a gate, a reset pulse 134 is supplied from the timing generator 110.

A gate of a MOSFET of N type which configures the buffer circuit 130 is connected to the FD part 124, and a drain is connected to the electric source Vdd. Between the buffer circuit 130 and a vertical signal line 136, an address gate 138 which comprises a MOSFET of N type exists, and to its gate, an address pulse 140 is supplied from the V selection means 106. And, a source of the buffer circuit 130 is connected to a drain of the address gate 138, and a source of the address gate 138 is connected to the vertical signal line 136.

The vertical signal line 136 is disposes with respect to each column of the pixel 120 which was arranged in a matrix shape, and a source of the address gate 138 of the pixel 120 which belongs to the same column is all connected to the corresponding vertical signal line 136. On end of the vertical signal line 136 is connected to a constant current source 114 in the constant current part 114A which was disposed outside the pixel region 104, and a constant current is made to flow through the vertical signal line 136. The other end of the vertical signal line 136 is connected to a signal processing part 112 which was disposed outside the pixel region 104.

In the signal processing part 112, with respect to each vertical signal line 136, first and second sample hold circuits 142, 144, CDS (Correlated Double Sampling) circuit 146 (first arithmetic circuit) and so on are disposed. The first and second sample hold circuits 142, 144, first and second sampling pulses 148, 150 being supplied thereto from the timing generator 110, holds a signal voltage which the buffer circuit 130 outputted to the vertical signal line 136. The CDS circuit 146 calculates a difference of voltages which these first and second sample hold circuits 142, 144 held.

Output signals of the CDS circuit 146 with respect to each vertical signal line 136 are sequentially selected by the H selection means 108 which operates on the basis of a timing signal from the timing generator 110, and outputted to the horizontal signal line 116, and outputted through the output part 118. The output part 118 is configured in detail by an amplification circuit, an AGC circuit, an A/D converter and so on.

Next, an operation of the solid-state image sensing apparatus 102 which was configured in this manner will be explained with also reference to FIG. 30, and centrally on an operation in the pixel 120.

The V selection means 106 operates on the basis of the timing pulse from the timing generator 110, and selects a row of the pixel region 104, and outputs the address pulse 140 (high level) at timing T1, to the pixel 120 which belongs to the selected row. This address pulse 140 is supplied to the address gate 138 in each pixel 120, and as a result, the address gate 138 is turned ON, and the buffer circuit 130 is connected to the vertical signal line 136.

Next, the timing generator 110 outputs the reset pulse 134 at timing T2, and by this, the reset gate 128 is turned ON, and the FD part 124 is connected to the electric source Vdd, and electric charges (electrons) which are stored in the FD part 124 are excluded. And, a voltage of the FD part 124 in this reset state is outputted to the vertical signal line 136 by the buffer circuit 130.

In passing, since the buffer circuit 130 forms a source follower circuit together with the constant current source 114, when the address gate 138 is ON, a gate voltage, i.e., a voltage which followed the voltage of the FD part 124, is outputted from the buffer circuit 130 to the vertical signal line 136 with low impedance.

Subsequently, at timing T3, the timing generator 110 outputs the first sampling pulse 148 to each first sample hold circuit 142 which was disposed with respect to each vertical signal line 136, and has a voltage, which was outputted to the vertical signal line 136 by the buffer circuit 130, held.

After that, at timing T4, the timing generator 110 outputs the transfer pulse 132, and has the transfer gate 126 turned ON, and has electric charges (electrons), which were stored due to such a fact that the photo diode 122 received light up to the timing T4, transferred to the FD part 124. The FD part 124 generates a voltage which corresponded to an amount of electric charges transferred, and the buffer circuit 130 outputs its voltage to the vertical signal line 136 with low impedance.

And, the timing generator 110, at timing T5, outputs the second sampling pulse 150 to each second sample hold circuit 144 which was disposed with respect to each vertical signal line 136, and at this time, has a voltage, which the buffer circuit 130 outputs to the vertical signal line 136, held. By this, the CDS circuit 146, which was disposed with respect to each vertical signal line 136, calculates a difference of a voltage at the time of reset which the first sample hold circuit 142 is holding and a voltage that the second sample hold circuit 144 is holding, and removes an offset portion, and outputs a voltage of a size which corresponds to an amount of received light of the photo diode 122.

In passing, since the above-described offset portion has different size with respect to each pixel 120, by removing the offset portion by the CDS circuit 146 in this manner, it is possible to remove noises due to variation of offset.

Output signals of the CDS circuit 146 with respect to each vertical signal line 136, on the basis of the timing pulse from the timing generator 110, are sequentially selected by the H selection means 108 and outputted to the horizontal signal line 116, and outputted as an image signal through the output part 118.

The V selection means 106, at timing T6, returns the address pulse 140 to a low level, and as a result, the address gate 138 is turned OFF and the buffer circuit 130 is cut off from the vertical signal line 136, and an operation regarding the pixel 120 which is of 1 row portion is completed.

Thereafter, the V selection means 106 operates on the basis of the timing pulse from the timing generator 110, and sequentially selects each row of the pixel 120. And, the above-described operation is carried out with respect to each row, and when the V selection means 106 selected all rows, image signals of 1 sheet portion of an image which was generated by all pixels 120 is to have been outputted.

However, in the such like solid-state image sensing apparatus 102, it was only possible to detect such a range that electric charges which the photo diode 122 generated overflow, i.e., an amount of light with a range up to a saturation level of the photo diode 122. Therefore, for example, in case that a diaphragm and shutter speed were fit in a dark portion of an object of shooting, the photo diode 122 is saturated at a bright portion of the object of shooting, and therefore, the entirety is shot as for example, stark white and it was impossible to obtain an image.

In order to realize a solution of this problem, in JP-A-11-313257 gazette, disclosed is a solid-state image sensing device in which a dynamic range was expanded by configuring such that a signal which corresponded to logarithm of an amount of received light is outputted. However, in this solid-state image sensing device, for the reason that a capacitor is used, there are such defects that its charging and discharging takes time, and a residual image occurs. And, since it is not possible to use an embedded photo diode (between an insulation film on a photo diode surface and a photo diode, for example, a P+ layer is formed) which has structurally an advantage of less noises, there is such a problem that image quality is inferior. And, since there are many constituent elements of a pixel circuit, miniaturization is difficult.

Also, also known is a such a technique that shooting is carried out with such short time and sufficiently long time that the photo diode 122 is not saturated by changing the shutter speed, therefore electric charge storage time in the photo diode 122, and by combining each shot image, a dynamic range is expanded, but in this method, for the reason that a line memory and a frame memory are required, an apparatus grows in size, and also, cost becomes high. And, since 2 signals with different light exposure periods are combined, application to a moving object of shooting is difficult. Further, also known is such a technology that, by changing electric charge storage time between adjacent rows of the pixel region 104, a memory becomes unnecessary, but in this technology, since calculation processing between adjacent rows is required, an apparatus grows in size, and also, a structure becomes complex. Further, since 1 signal is generated by 2 pixels, resolution is deteriorated.

This invention is one which was made to solve the suchlike problems, and its object is to provide a solid-state image sensing apparatus and its driving method which has a wide dynamic range, and is of high performance, and further, is of small size, and of low cost.

DISCLOSURE OF THE INVENTION

This invention is, in order to achieve the above-described object, characterized by having a pixel which includes a photoelectric conversion device, a charge voltage conversion part for generating a voltage of a size which corresponded to an amount of electric charges, a transfer gate for connecting the photoelectric conversion device to the charge voltage conversion part when a transfer pulse was supplied, a reset gate for connecting the charge voltage conversion part to a predetermined electric potential point when a reset pulse was supplied, a buffer part for outputting a voltage of the charge voltage conversion part, and an address gate for connecting the buffer part to a signal line when an address pulse was supplied, driving means for supplying the transfer pulse to the transfer gate after a first reset pulse was supplied to the reset gate; and subsequently supplying to the reset gate a second reset pulse which is completed during the address pulse is supplied, a first signal path for processing a voltage which the buffer part outputs subsequent to the transfer pulse as a first light detection voltage by the photoelectric conversion device, and a second signal path for processing an output voltage of the buffer part before the first reset pulse is supplied to the reset gate, as a second light detection voltage by the photoelectric conversion device.

In the suchlike solid-state image sensing apparatus of this invention, before the reset pulse is supplied to the reset gate, the output voltage of the buffer part is taken in the second signal path. At a stage before this first reset pulse is supplied to the reset gate, in case that an amount of incident light to the photoelectric conversion device is large, electric charges that the photoelectric conversion device generated overflow from the photoelectric conversion device and flow into the charge voltage conversion part, and further, they also overflow in the charge voltage conversion part, and flow out to the predetermined electric potential point.

At this time, a voltage of the charge voltage conversion part is determined by a size of a current due to electric charges which flow out to the predetermined electric potential point, but since the reset gate has a small current flowing through a channel, and operates in a sub-threshold region, a voltage of the charge voltage conversion part becomes a value which corresponded to logarithm of a current value. And, since a voltage of the charge voltage conversion part is outputted through the buffer part, and supplied to the second signal path, in case that the amount of incident light is large, a voltage which is supplied to the second signal path becomes a value which corresponded to logarithm of the amount of incident light.

That is, in this invention, in case that an amount of incident light of the photoelectric conversion device is large, a voltage which corresponded to logarithm of the amount of incident light is outputted from the second signal path, and thus, it is possible to realize a solid-state image sensing apparatus with wide dynamic range.

Also, this invention is a driving method of a solid-state image sensing apparatus having a pixel which includes a photoelectric conversion device, a charge voltage conversion part for generating a voltage of a size which corresponded to an amount of electric charges, a transfer gate for connecting the photoelectric conversion device to the charge voltage conversion part when a transfer pulse was supplied, a reset gate for connecting the charge voltage conversion part to a predetermined electric potential point when a reset pulse was supplied, a buffer part for outputting a voltage of the charge voltage conversion part, and an address gate for connecting the buffer part to a signal line when an address pulse was supplied, and is characterize by having a driving step for supplying the transfer pulse to the transfer gate after a first reset pulse was supplied to the reset gate, and subsequently supplying to the reset gate a second reset pulse which is completed during the address pulse is supplied, a first detection processing step for processing a voltage which the buffer part outputs subsequent to the transfer pulse, as a first light detection voltage by the photoelectric conversion device, and a second detection processing step for processing an output voltage of the buffer part before the first reset pulse is supplied to the reset gate, as a second light detection voltage by the photoelectric conversion device.

In the suchlike driving method of a solid-state image sensing apparatus of this invention, before the first reset pulse is supplied to the reset gate, it is taken in the output voltage of the buffer part. At a stage before this first reset pulse is supplied to the reset gate, in case that an amount of incident light to the photoelectric conversion device is large, electric charges that the photoelectric conversion device generated overflow from the photoelectric conversion device and flow into the charge voltage conversion part, and further, they also overflow in the charge voltage conversion part, and flow out to the predetermined electric potential point.

At this time, a voltage of the charge voltage conversion part is determined by a size of a current due to electric charges which flow out to the predetermined electric potential point, but since the reset gate has a small current flowing through a channel, and operates in a sub-threshold region, a voltage of the charge voltage conversion part becomes a value which corresponded to logarithm of a current value. And, since a voltage of the charge voltage conversion part is outputted through the buffer part, in case that the amount of incident light is large, the voltage becomes a value which corresponded to logarithm of the amount of incident light.

That is, in this invention, in case that an amount of incident light of the photoelectric conversion device is large, a voltage which corresponded to logarithm of the amount of incident light is outputted, and thus, it is possible to realize a solid-state image sensing apparatus with wide dynamic range.

Also, this invention is characterized by having a pixel part configured by arranging pixels in a two-dimensional matrix shape, in which the pixel includes a photoelectric conversion device, a charge voltage conversion part for generating a voltage of a size which corresponded to an amount of electric charges, a transfer gate for connecting the photoelectric conversion device to the charge voltage conversion part when a transfer pulse was supplied, a reset gate for connecting the charge voltage conversion part to a predetermined electric potential point when a reset pulse was supplied, a buffer part for outputting a voltage of the charge voltage conversion part, and an address gate for connecting the buffer part to a signal line when an address pulse was supplied, vertical selection means for selecting a first line in the pixel part and a second line preceding the first line and sequentially shifting the respective lines, first timing control means for resetting the charge voltage conversion part of a pixel of the first line by supplying a first reset pulse to the reset gate of the pixel of the first line at a first timing, and for having a first voltage which the charge voltage change part of the pixel of the first line generated, outputted from the buffer part of the pixel of the first line, by supplying a first transfer pulse to the transfer gate of the pixel of the first line, a second timing control part for having a second voltage which the charge voltage conversion part of the pixel of the first line generated, outputted from the buffer part of the pixel of the first line at a second timing which is prior to the first timing, and a third timing control part for having the charge voltage conversion part of a pixel of the second line reset by supplying the second reset pulse to the reset gate of the pixel of the second line at a third timing.

In the suchlike solid-state image sensing apparatus of this invention, before the charge voltage conversion part is reset by control of the first timing control means at the first timing, by control of the second timing control means, the second voltage which the charge voltage conversion part is generating is outputted through the buffer part. Also, the charge voltage conversion part is reset in advance, prior to the second timing, under control by the third timing control means. Therefore, the second voltage is such a voltage that, in case that the amount of incident light is excessive, after the charge voltage conversion part was reset by control of the third timing control means, excessive signal charges which the photoelectric conversion device generated overflow and are moved to and stored in the charge voltage conversion part, and as a result, the charge voltage conversion part generated.

That is, in the solid-state image sensing apparatus of this invention, even in case that the amount of incident light is excessive and signal charges which the photoelectric conversion device generated overflowed from the photoelectric conversion device to the charge voltage conversion part, a voltage which linearly changes to an amount of overflowed signal charges is generated by the charge voltage conversion part, and outputted as a second voltage. Thus, in case that the amount of incident light is of a normal size, by use of the first voltage, and in case that the amount of incident light is excessive, by use of the second voltage, image signals are generated, and thereby, even in case that the amount of incident light is excessive, it is possible to obtain image signals which change in size linearly to the amount of incident light, and shooting with wide dynamic range becomes possible.

Also, this invention is a driving method of a solid-state image sensing apparatus having a pixel part configured by arranging pixels in a two-dimensional matrix shape, in which the pixel includes a photoelectric conversion device, a charge voltage conversion part for generating a voltage of a size which corresponded to an amount of electric charges, a transfer gate for connecting the photoelectric conversion device to the charge voltage conversion part when a transfer pulse was supplied, a reset gate for connecting the charge voltage conversion part to a predetermined electric potential point when a reset pulse was supplied, a buffer part for outputting a voltage of the charge voltage conversion part, and an address gate for connecting the buffer part to a signal line when an address pulse was supplied, and vertical selection means for selecting a first line in the pixel part and a second line preceding the first line and sequentially shifting the respective lines, and characterized by having a first timing control step for resetting the charge voltage conversion part of a pixel of the first line by supplying a first reset pulse to the reset gate of the pixel of the first line at a first timing, and for supplying a first transfer pulse to the transfer gate of the pixel of the first line, and for outputting a first voltage which the charge voltage conversion part of the pixel of the first line generated from the buffer part of the pixel of the first line, a second timing control step for outputting a second voltage which the charge voltage conversion part of the pixel of the first line is generating, from the buffer part of the pixel of the first line at a second timing which is prior to the first timing, and a third timing control step for resetting the charge voltage conversion part of a pixel of the second line by supplying a second reset pulse to the reset gate of the pixel of the second line at a third timing.

In the suchlike driving method of a solid-state image sensing apparatus of this invention, before the charge voltage conversion part is reset by control of the first timing control step in the first timing, by control due to the second timing control step, the second voltage which the charge voltage conversion part is generating is outputted through the buffer part. Also, the charge voltage conversion part is reset in advance, prior to the second timing, under control due to the third timing control step. Therefore, the second voltage is such a voltage that, in case that the amount of incident light is excessive, after the charge voltage conversion part was reset by control of the third timing control step, excessive signal charges which the photoelectric conversion device generated overflow and are moved to and stored in the charge voltage conversion part, and as a result, the charge voltage conversion part generated.

That is, in the driving method of this invention, even in case that the amount of incident light is excessive and signal charges which the charge voltage conversion part generated overflowed from the photoelectric conversion device to the charge voltage conversion part, a voltage which charges linearly to an amount of the overflowed signal charges is generated by the charge voltage conversion part, and outputted as the second voltage. Thus, in case that the amount of incident light is of a normal size, by use of the first voltage, and in case that the amount of incident light is excessive, by use of the second voltage, image signals are generated, and thereby, even in case that the amount of incident light is excessive, it is possible to obtain image signals which change in size linearly to the amount of incident light, and shooting with wide dynamic range becomes possible.

Also, this invention is characterized by having a pixel which includes a photoelectric conversion device, first voltage generation means for generating a first voltage on the basis of signal charges which were generated due to light reception of the photoelectric conversion device and stored in the photoelectric conversion device, and second voltage generation means for generating a second voltage which corresponds to strength of an incident light when it received the incident light which is stronger than such an incident light that the first voltage which is generated by the first voltage generation means is saturated, first signal output means for outputting the first voltage, second signal output means for outputting the second voltage, sensitivity control means for controlling the second voltage generation means and for adjusting, as light detection sensitivity, a relationship of strength of an incident light to the pixel and a size of the second voltage, and third signal output means for outputting a sensitivity signal which relates to the light detection sensitivity which the sensitivity control means adjusts, wherein the first and the second signal output means output the first and second voltage through a common output terminal in a time division manner.

In the suchlike solid-state image sensing apparatus of this invention, the first voltage generation means generates the first voltage on the basis of the signal charges which were generated due to light reception of the photoelectric conversion device and stored in the photoelectric conversion device, and the first signal output means outputs this first voltage to outside. Also, the second voltage generation means generates the second voltage which corresponds to strength of an incident light when it received the incident light which is stronger than such an incident light that the first voltage which is generated by the first voltage generation means is saturated, and the second signal output means outputs this second voltage to outside. Therefore, even in case that a difference between a bright portion and a dark portion in an object of shooting is large, by use of the second voltage together with the first voltage, it is possible to properly generate an image, and shooting with a wide dynamic range becomes possible.

And, in this invention, by the first signal output means, the first voltage is outputted to outside and by the second and third signal output means, the second voltage and the sensitivity signal are outputted to outside, respectively. Therefore, at an outside of the solid-state image sensing apparatus, by use of these first and second voltages and the sensitivity signal, corresponding to various shooting conditions, it is possible to freely and accurately carry out signal processing and to generate good images, and it is possible to realize a solid-state image sensing apparatus with high flexibility, excellent versatility and a wide dynamic range.

Also, this invention is characterized by being a driving method of a solid-state image sensing apparatus having a pixel which includes a photoelectric conversion device, first voltage generation means for generating a first voltage on the basis of signal charges which were generated due to light reception of the photoelectric conversion device and stored in the photoelectric conversion device, and second voltage generation means for generating a second voltage which corresponds to strength of an incident light when it received the incident light which is stronger than such an incident light that the first voltage which is generated by the first voltage generation means is saturated, and characterized by having a first signal output step for outputting the first voltage which the first voltage generation means generated, a second signal output step for outputting the second voltage which the second voltage generation means generated, a sensitivity control step for controlling the second voltage generation means and for adjusting, as light detection sensitivity, a relationship of strength of an incident light to the pixel and a size of the second voltage, and a third signal output step for outputting a sensitivity signal which relates to the light detection sensitivity to be adjusted in the sensitivity control means step, wherein the first and second signal output means output the first and second voltages through a common output terminal in a time division manner.

In the suchlike driving method of a solid-state image sensing apparatus of this invention, the first voltage generation means generates the first voltage on the basis of the signal charges which were generated due to light reception of the photoelectric conversion device and stored in the photoelectric conversion device, and the first signal output step outputs this first voltage to outside. Also, the second voltage generation means generates the second voltage which corresponds to strength of an incident light when it received the incident light which is stronger than such an incident light that the first voltage which is generated by the first voltage generation means is saturated, and the second signal output step outputs this second voltage to outside. Therefore, even in case that a difference between a bright portion and a dark portion in an object of shooting is large, by use of the second voltage together with the first voltage, it is possible to properly generate an image, and shooting with a wide dynamic range becomes possible.

And, in this invention, by the first signal output step, the first voltage is outputted to outside and by the second and third signal output steps, the second voltage and the sensitivity signal are outputted to outside, respectively. Therefore, at an outside of the solid-state image sensing apparatus, by use of these first and second voltages and the sensitivity signal, corresponding to various shooting conditions, it is possible to freely and accurately carry out signal processing and to generate good images, and it is possible to realize a solid-state image sensing apparatus with high flexibility, excellent versatility and a wide dynamic range.

BEST MODE FOR CARRYING OUT THE INVENTION

Next, embodiments of this invention will be explained with reference to the drawings.

Figure 1:
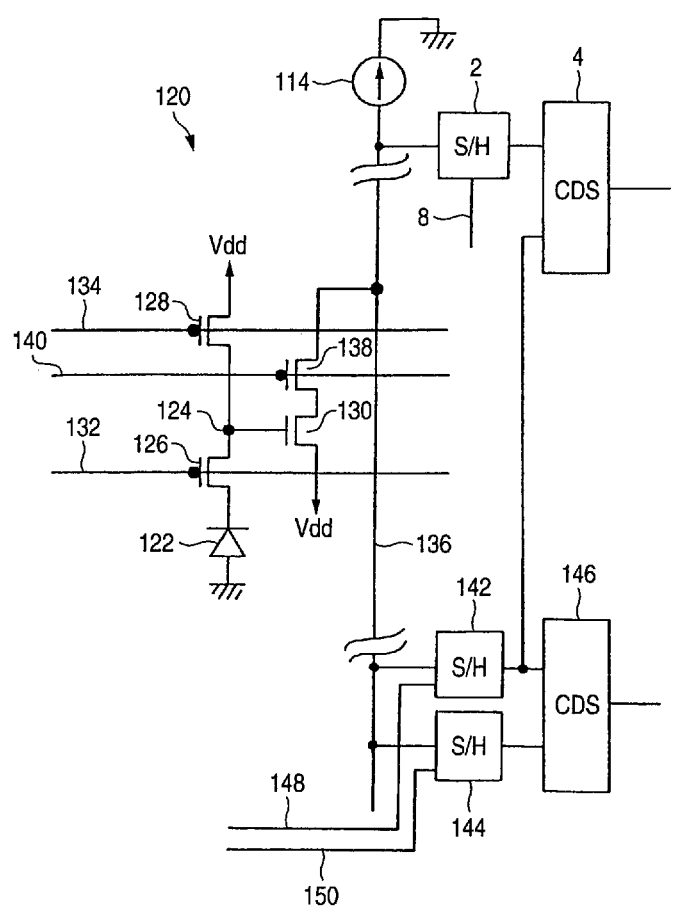
FIG. 1 is a circuit diagram showing a pixel part periphery which configures a solid-state image sensing apparatus according to a first embodiment of this invention.
Figure 2:
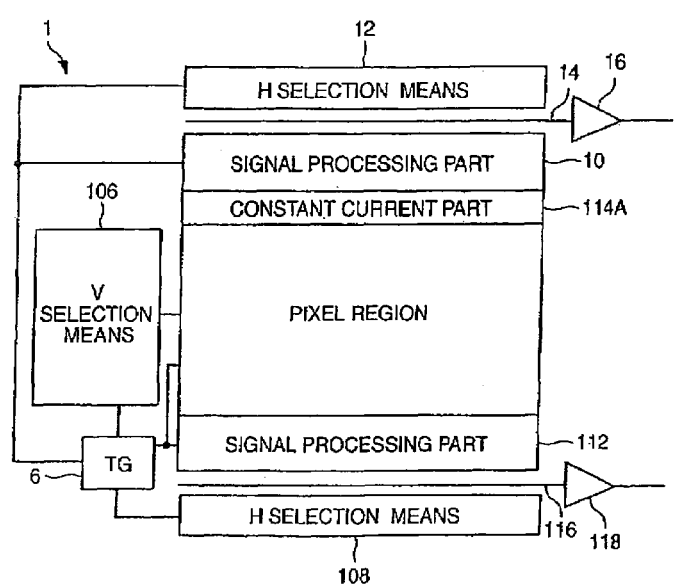
FIG. 2 is a block diagram showing the entirety of the solid-state image sensing apparatus shown in FIG. 1.
Figure 3:
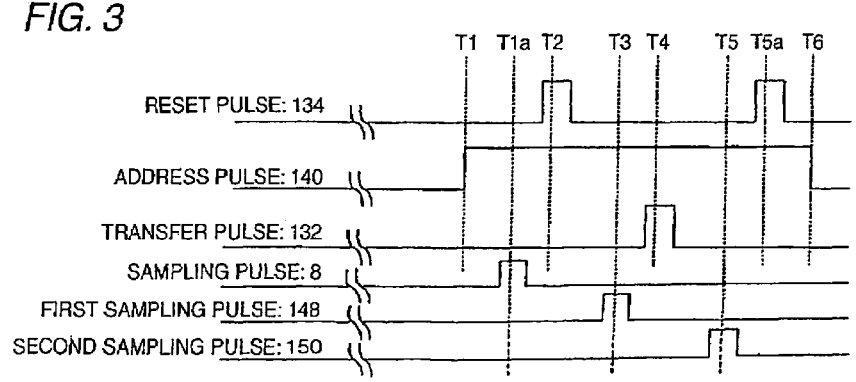
FIG. 3 is a timing chart showing an operation of the pixel part periphery shown in FIG. 1.
Figure 28:
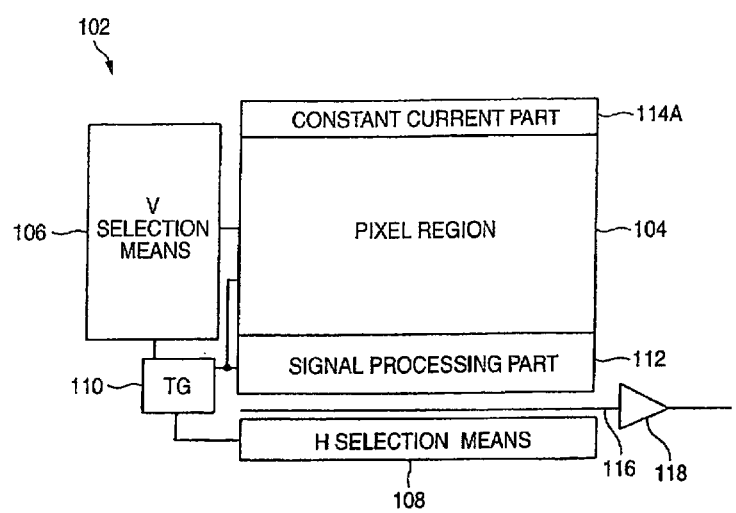
FIG. 28 is a block diagram showing a conventional solid-state image sensing apparatus.
Figure 29:
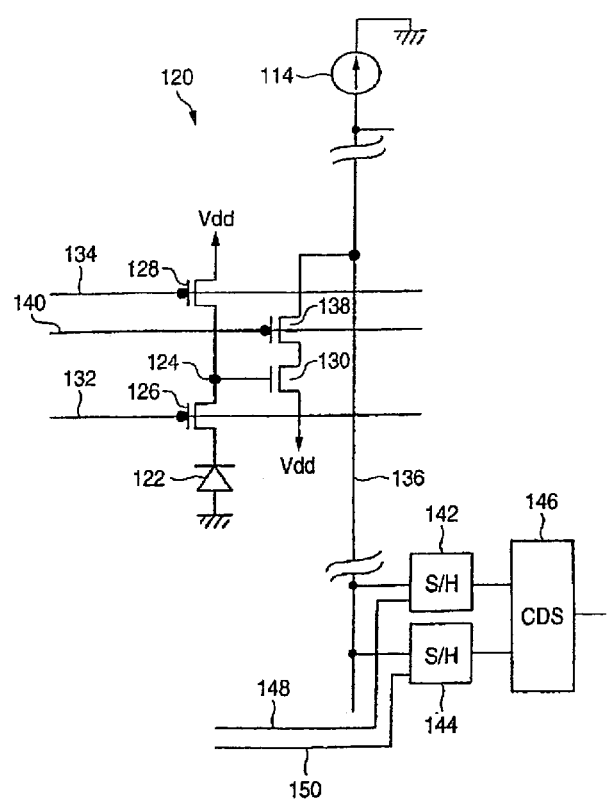
FIG. 29 is a circuit diagram showing 1 pixel part periphery which configures the solid-state image sensing apparatus of FIG. 28.

FIG. 1 is a circuit diagram showing a pixel part periphery which configures one example of a solid-state image sensing apparatus according to this invention, FIG. 2 is a block diagram showing the entirety of the solid-state image sensing apparatus shown in FIG. 1, FIG. 3 is a timing chart chiefly showing an operation of a pixel part of FIG. 1, and FIGS. 4A through FIG. 4E are potential views of a photo diode periphery which configures the pixel part of FIG. 1. In passing, in FIG. 1, FIG. 2, the same reference numerals and signs are given to the same elements as in FIG. 28, FIG. 29, and detail explanations regarding those will be omitted here.

As shown in FIG. 1, in a solid-state image sensing apparatus of this embodiment, to each column of a pixel region 104 in which pixels 120 were disposed in a matrix shape, a sample hold circuit 2, and a CDS circuit 4 (second arithmetic circuit) are newly disposed. The sample hold circuit 2 holds a voltage which is outputted to a vertical signal line 136 on the basis of a sampling pulse 8 from a timing generator 6 (FIG. 2), and the CDS circuit 4 calculates a difference of the voltage which the sample hold circuit 2 is holding, and a voltage which a first sample hold circuit 142 is holding, and removes an offset portion. These circuits are disposed in a signal processing part (S/H•CDS part) 10 which was shown in FIG. 2.

Also, in this embodiment, as shown in FIG. 2, an H selection means 12 as well as the S/H•CDS part 10 are newly disposed, and output signals of the CDS circuit 4 of the S/H•CDS part 10 are sequentially selected by the H selection means 12, and outputted through a horizontal signal line 14 from an output part 16. The output part 16 is in detail configured by an amplification circuit, an AGC circuit, an A/D converter and so on.

The timing generator 6, in the same manner as in the past, supplies timing pulses to the pixel 120, a V selection means 106, an H selection means 108, and a signal processing part (S/H•CDS part) 112, and outputs timing pulses to the S/H•CDS part 10 and the H selection means 12.

Next, an operation of a solid-state image sensing apparatus 1 of this embodiment will be explained with also reference to FIG. 3, FIGS. 4A through FIG. 4E.

Figure 4A:
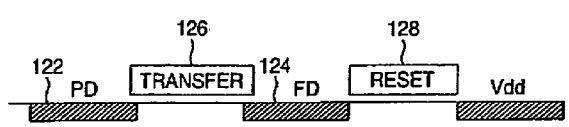
FIGS. 4A through FIG. 4E are potential views of a photo diode periphery part which configures a pixel part shown in FIG. 1.
Figure 30:
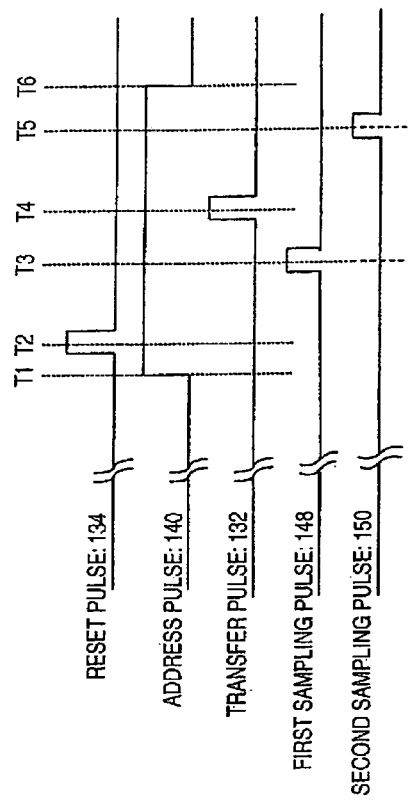
FIG. 30 is a timing chart showing an operation of a circuit shown in FIG. 29.

In FIG. 3, the same reference numerals and signs are given to timings which correspond to timings shown in FIG. 30. FIG. 4A shows a physical relationship of a photo diode 122 (PD), a transfer gate 126, an FD part 124, a reset gate 128, and an electric source Vdd in the pixel 120, and FIGS. 4B through FIG. 4E show potential conditions of each part in each timing shown in FIG. 3. In FIGS. 4B through FIG. 4E, down below becomes a positive direction.

The V selection means 106 operates as a part of the timing pulse generation means which relates to this invention on the basis of the timing pulse from the timing generator 6, and selects a row of the pixel region 104, and to the pixel 120 which belongs to the selected row, outputs an address pulse 140 (high level) at timing T1. This address pulse 140 is supplied to an address gate 138 in each pixel 120, and as a result, the address gate 138 is turned ON and a buffer circuit 130 is connected to the vertical signal line 136. At this time, since the buffer circuit 130 forms a source follower circuit together with a constant current source 114, a gate voltage, i.e., a voltage which followed a voltage of the FD part 124 is outputted from the buffer circuit 130 to the vertical signal lien 136 with low impedance.

After that, the timing generator 6 outputs the sampling pulse 8 to the sample hold circuit 2 at timing T1a, and has a voltage of the FD part 124 which is outputted through the buffer circuit 130 to the vertical signal line 136, held. In passing, as to what-like voltage the voltage which was held here is, it will be explained later in detail with reference to FIG. 4A through FIG. 4F.

Next, the timing generator 6 outputs a reset pulse 134 at timing T2, and by this, the reset gate 128 is turned ON and the FD part 124 is connected to the electric source Vdd, and electric charges which are stored in the FD part 124 are excluded. And, a voltage of the FD part 124 in this reset state is outputted to the vertical signal line 136 by the buffer circuit 130.

Subsequently, at timing T3, the timing generator 6 outputs a first sampling pulse 148 to each first sample hold circuit 142 which was disposed with respect to each vertical signal line 136, and has a voltage which was outputted to the vertical signal line 136 by the buffer circuit 130, held.

After that, at timing T4, the timing generator 6 outputs a transfer pulse 132, and has the transfer gate 126 turned ON, and has electric charges which were stored due to light reception of the photo diode 122 up to the timing T4, transferred to the FD part 124. The FD part 124 generates a voltage which corresponded to an amount of the transferred electric charges, and the buffer circuit 130 outputs that voltage to the vertical signal line 136 with low impedance.

And, the timing generator 6 outputs, at timing T5, a second sampling pulse 150 to each second sample hold circuit 144 which was disposed with respect to each vertical signal line 136, and at this time, has a voltage which the buffer circuit 130 outputs to the vertical signal line 136, held. By this, in the S/H•CDS part 112, a CDS circuit 146 which was disposed with respect to each vertical signal line 136 calculates a difference of voltages which the first and second sample hold circuits 142, 144 are holding, and removes an offset portion, and outputs a voltage of a size which corresponds to an amount of received light of the photo diode 122. Output signals of the CDS circuit 146 with respect to each vertical signal line 136 are sequentially selected by the H selection means 108 on the basis of timing pulses from the timing generator 6, and outputted to a horizontal signal line 116, and outputted as an image signal through an output part 118.

On one hand, in the S/H•CDS part 10, the CDS circuit 4 which was disposed with respect to each vertical signal line 136 calculates a difference of a voltage which the sample hold circuit 2 is holding and a voltage at the time of reset, which the first sample hold circuit 142 (S/H•CDS part 112) is holding, and removes an offset portion, and outputs a voltage of a size which corresponds to an amount of received light of the photo diode 122. Output signals of the CDS circuit 4 with respect to each vertical signal line 136 are sequentially selected by the H selection means 12 on the basis of the timing pulse from the timing generator 6, and outputted to the horizontal signal line 14, and outputted as an image signal through the output part 16.

The timing generator 6, in order to be prepared for a next cycle, at timing T5a, outputs the reset pulse 134 again. By this, the reset gate 128 is turned ON and the FD part 124 is connected to the electric source Vdd, and electric charges which are stored in the FD part 124 are excluded.

The V selection means 106 returns the address pulse 140 to a low level at timing T6, and as a result, the address gate 138 is turned OFF and the buffer circuit 130 is cut off from the vertical signal line 136, and an operation regarding the pixel 120 which is of 1 row portion is completed.

Thereafter, the V selection means 106 operates on the basis of the timing pulse from the timing generator 6, and sequentially selects each row of the pixel 120. And, the above-described operation is carried out with respect to each row, and when the V selection means 106 selected all rows, image signals of 1 sheet portion of an image which was generated by all pixels 120 are to have been outputted.

Figure 4B:
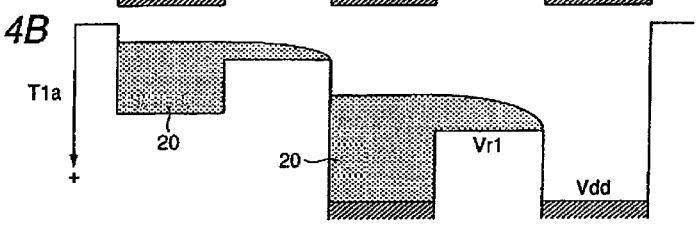

Next, with reference to FIG. 4A through FIG. 4E which show potential of each part in case that the amount of incident light to the photo diode 122 is large, more detailed explanation will be carried out. FIG. 4B shows a condition at timing T1a of FIG. 3, and FIG. 4C, FIG. 4D, FIG. 4E show conditions at timing T3, T5, T6, respectively.

In case that the amount of incident light to the photo diode 122 is large, as shown in FIG. 4B, electric charges 20 which were generated due to light reception of the photo diode 122 overrun the transfer gate 126 and overflow into the FD part 124, and further, in case that the amount of incident light is large, they also overflow the FD part 124, and the electric charges 20 overrun the reset gate 128 and flow into the electric source Vdd.

At this time, a voltage of the FD part 124 is determined by a size of a current due to electric charges which flow out to the electric source Vdd, but the amount of electric charges which the photo diode 122 generates is small, and a current flowing through a channel of the reset gate 128 which is made by a MOSFET is a weak current with an order of nano ampere, and the reset gate 128 operates in the sub-threshold region, and therefore, the voltage of the FD part 124 becomes a value which corresponded to logarithm of a current value.

And, since the voltage of this FD part 124 is outputted through the buffer circuit 130, and supplied to the sample hold circuit 2, in case that the amount of incident light is large, a voltage which the sample hold circuit 2 holds at timing T1a becomes a value which corresponded to logarithm of the amount of incident light.

In passing, in case that the amount of incident light is of such a level that electric charges overflow from the photo diode 122 to the FD part 124 but do not overflow from the FD part 124 to the electric source, the FD part 124 generates a voltage which corresponds to electric charges overflowed from the photo diode 122, and therefore, a voltage which the sample hold circuit 2 holds becomes a voltage which is in proportion to the amount of electric charges overflowed from the photo diode 122.

Figure 4C:
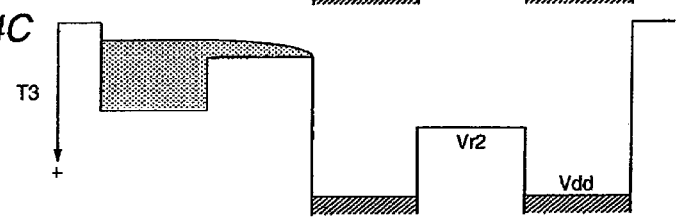

After that, at timing T2, the FD part 124 is reset, and potential of each part becomes as in FIG. 4C, and a voltage of the FD part 124 right after reset is outputted through the buffer, and held in the first sample hold circuit 142 (timing T3).

As described above, since the CDS circuit 4 calculates a difference of a voltage which the sample hold circuit 2 is holding and a voltage of a reset level (offset portion) which the first sample hold is holding, its output voltage becomes a voltage to which offset adjustment was applied in case that the amount of incident light is large.

Figure 4D:
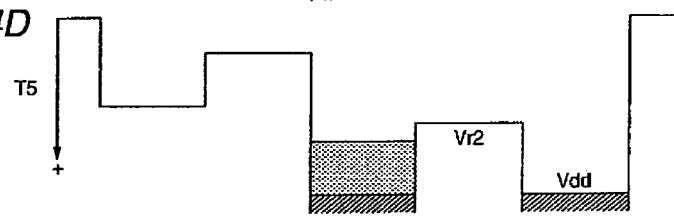

Next, for the reason that the transfer gate 126 is turned ON at timing T4, as shown in FIG. 4D, electric charges 20 which were stored in the photo diode 122 are transferred to the FD part 124 and stored in the FD part 124. And, at timing T5, a voltage which corresponds to the amount of this electric charges is held by the second sample hold circuit 144. This voltage, if it is of such a level that the amount of incident light does not saturate the photo diode 122, becomes a voltage which corresponded to the amount of incident light, but in case that the amount of incident light is large as in the current case, it becomes a voltage which corresponds to such a condition that the photo diode 122 was saturated.

And, the CDS circuit 146 of the S/H•CDS part 112 calculates a difference of 2 voltages which the first and second sample hold circuits 142, 144 are holding as described above.

Figure 4E:
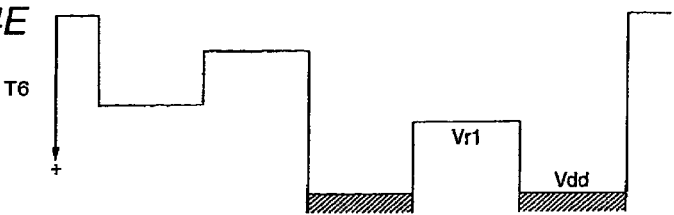

After that, since the FD part 124 is reset again at timing T5a, potential as shown in FIG. 4E becomes such a state that electric charges are not stored in any places. And, after this, electric charges which were generated due to light reception of the photo diode 122 are gradually stored in a place of the photo diode 122, and at timing T1a of a next cycle, a voltage which corresponds to electric charges stored by then is to be obtained as described above.

In this manner, in the solid-state image sensing apparatus 1 of this embodiment, even in case that the amount of incident light of the photo diode 122 is large, a voltage which corresponded to logarithm of the amount of incident light is outputted from the sample hold circuit 2, therefore, from the output part 16.

On that account, at a place of standard brightness (brightness by which the photo diode 122 is not saturated) in an object of shooting, an output of the output part 118 whose signal level varies in proportion to brightness as in the past can be used, and at a place of more brightness that that, a logarithm output of the output part 16 can be used. By this, it becomes possible to realize a solid-state image sensing apparatus which had a wide dynamic range which is, for example, 10,000 times of the conventional one.

Also, in this embodiment, as described above, since signals can be outputted at the same time from the output part 118 and the output part 16, it is possible to select to use both outputs, or to use only one, according to need and degree of freedom is high in signal processing of a subsequent stage.

Also, since a capacitor etc. are not used for logarithm transformation, there occurs no problem of a residual image, and also, since it is possible to use the embedded photo diode 122 with less noises, good image quality is obtained.

And, there is no necessity of using a line memory, a frame memory, and of carrying out calculation processing between rows of the pixel region 104, a structure and a processing content are simple, which is advantageous to miniaturization of an apparatus, and there occurs no case that a manufacturing cost is particularly increased.

Further, since a structure of the pixel 120 is the same as in the past, there occurs no case that a size of the pixel 120 grows larger, and this point is also advantageous to miniaturization of a solid-state image sensing apparatus.

Here, a channel voltage of a MOSFET which configures the reset gate 128 will be explained. In conditions of FIG. 4B and FIG. 4E (timing T1a, T6) for sampling a voltage of the FD part 124, a channel voltage Vr1 is set in such a manner that a voltage of the FD part 124 becomes a value which corresponds to logarithm of an amount of light, also to a large amount of light such as for example, 10,000 times of the amount of light which saturates the photo diode 122, and it becomes a voltage which falls in an input range of the buffer circuit 130. The suchlike channel voltage Vr1 determines a lower limit of potential, in many cases.

In passing, the setting of the channel voltage can be carried out concretely by an ion implantation under a gate of the MOSFET, adjustment of a gate voltage and so on.

On one hand, in conditions of FIG. 4C, FIG. 4D (timing T3, T5), a channel voltage Vr2 is set to such a value that the FD part 124 can receive all electric charges overflowed from the photo diode 122. The suchlike channel voltage Vr2 determines a upper limit of potential, in many cases.

The channel voltages Vr1, Vr2 which are set in the suchlike conditions may be an identical voltage to each other, but it is preferable that Vr1>Vr2 is realized. For example, assuming that a voltage of the electric source Vdd is 2.5V, in case that the channel voltage is defined to be a source voltage when a current becomes 1 nA, it is possible to realize Vr1=1.7V, Vr2=1.0V. In passing, the suchlike different channel voltages can be set by applying different voltages according to timing, to a gate of a MOSFET which configures the reset gate 128.

In this embodiment, it was designed that the CDS circuit 4 is disposed also in the S/H•CDS part 10, but it is possible to realize such a structure that removal of the offset portion is not carried out to the voltage which is held by the sample hold circuit 2. That is, a signal which the sample hold circuit 2 outputs is a signal in case that the amount of incident light is large, and its signal level is big. Therefore, even if a variation component of the offset portion with respect to each pixel 120 is included in the signal, its influence is small, and thus, a structure which does not use the CDS circuit 4 may be realized.

Also, in this embodiment, in case that the FD part 124 is reset, the FD part 124 is connected to the electric source Vdd through the reset gate 128, and a voltage of the FD part 124 was made to be a voltage of the electric source Vdd, but a voltage of the FD part 124 after reset is not limited to this, and may be a lower voltage than the electric source voltage, and also, in that case, the same operation and effects are obtained.

And, in this embodiment, it was explained that electrons are carriers, but also, in case that a P type MOSFET is used as a MOSFET which configures each gate etc., and positive holes are made to be carriers, essential operations do not change, and the same operation and effects are obtained.

Also, here, shown was the embodiment in case that the timing generator was built in, but even if the timing generator is external, it does not affect this invention. Also, cited was the embodiment which the S/H•CDS part (signal processing part) uses 2 sample hold circuits which were disposed in parallel, but it may be a circuit for taking and holding a difference of 2 signals. Further, it is possible to connect the buffer directly to the vertical signal line, and output to outside, and signal processing after the vertical signal line can be carried out by various forms.

Next, a second embodiment of this invention will be explained.

Figure 5:
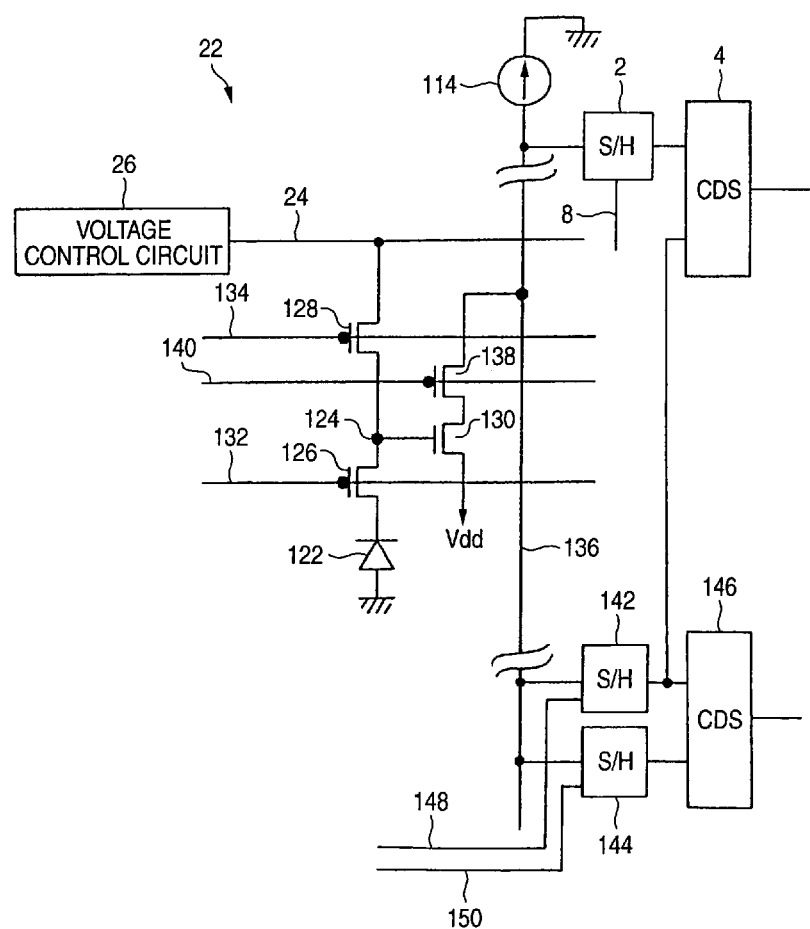
FIG. 5 is a circuit diagram showing a pixel part periphery which configures a solid-state image sensing apparatus of a second embodiment of this invention.
Figure 6:
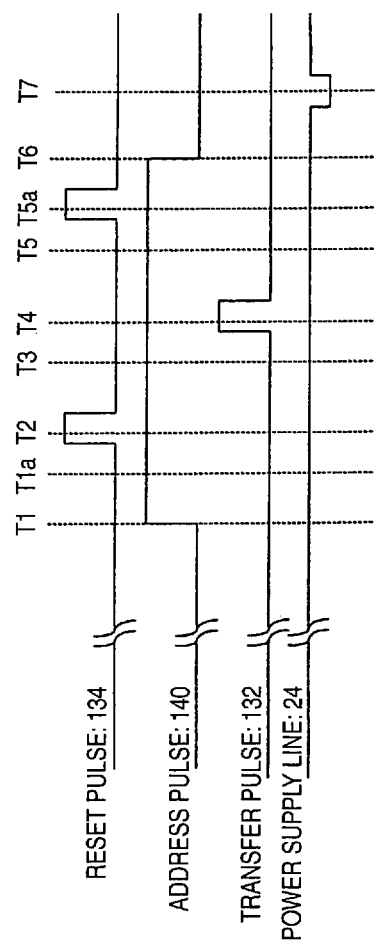
FIG. 6 is a timing chart showing an operation of a pixel part shown in FIG. 5.

FIG. 5 is a circuit diagram showing a pixel and its periphery which configure a solid-state image sensing apparatus of the second embodiment of this invention, FIG. 6 is a timing chart showing an operation of the pixel part of FIG. 5. In passing, in FIG. 5, the same reference numerals and signs are given to the same elements as in FIG. 1, and explanations regarding those will be omitted here. Also, in FIG. 6, the same reference numerals and signs are given to the same timings as in FIG. 3.

What the pixel part 22 shown in FIG. 5 is different from the pixel 120 of FIG. 1 is such a point that a drain of a transistor which configures the reset gate 128 is connected to a power supply line 24, and it is configured so as to apply a voltage from a voltage control circuit 26 to the power supply line 24.

And, the voltage control circuit 26, as shown in FIG. 6, usually outputs the same voltage as the electric source Vdd to the power supply line 24, but after the address gate 138 was turned OFF at timing T6, before the sampling pulse 8 is supplied to the sample hold circuit 2 at timing T1*a* of a next cycle, at timing T7, it is temporarily lowered to for example, a half voltage of a voltage of the electric source Vdd. By this, the FD part 124 becomes in such a state that it was filled by electric charges. Therefore, thereafter, the amount of incident light is large, and electric charges overflowed from the photo diode 122 overflow immediately to the power supply line 24 side. As a result, in this second embodiment, in case that the amount of incident light is large and electric charges overflow in the photo diode 122, from the beginning, a voltage which corresponded to logarithm of the amount of incident light is inputted to the buffer circuit 130, and thus, a relation of the amount of incident light and an output voltage of the buffer circuit 130 does not have a linear region in the halfway as in the case of the first embodiment, and becomes a relation of logarithm from the beginning.

In passing, in case that a voltage of the power supply line 24 is lowered too much at timing T7, since electric charges are injected up to the photo diode 122, it is not preferable. In this regard, however, after the timing T7, in case that reset of the electric charges which are stored in the photo diode 122 is also carried out, it is possible to make a ground potential.

Next, a third embodiment of this invention will be explained.

Figure 7:
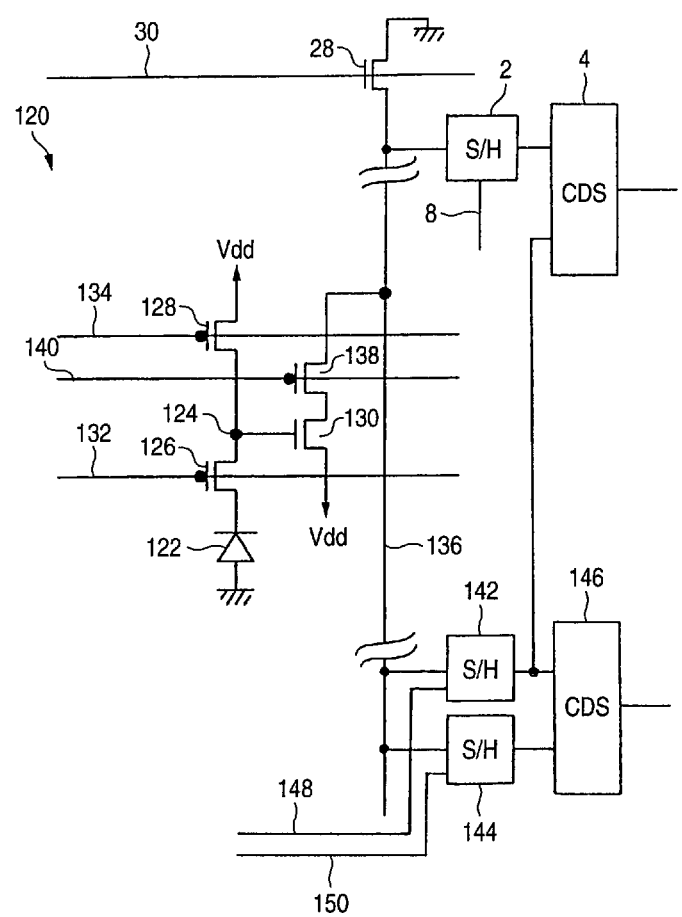
FIG. 7 is a circuit diagram showing a pixel part and its periphery which configure a solid-state image sensing apparatus of a third embodiment of this invention.
Figure 8:
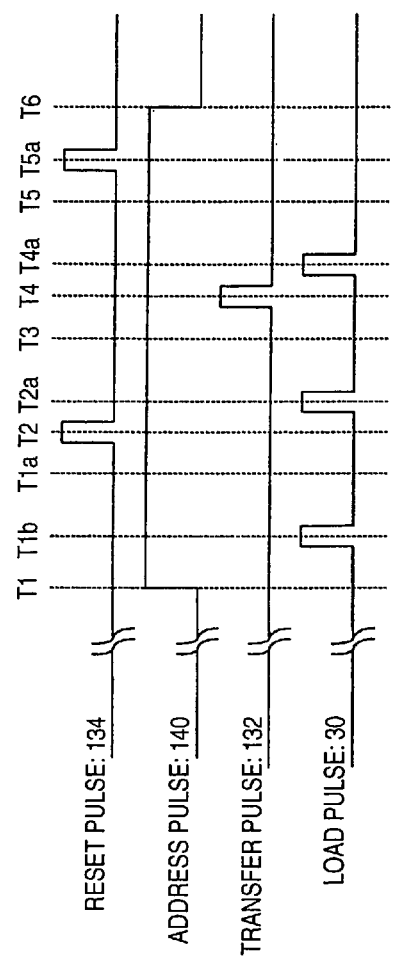
FIG. 8 is a timing chart showing an operation of the pixel part shown in FIG. 7.

FIG. 7 is a circuit diagram showing a pixel part and its periphery which configure a solid-state image sensing apparatus of the third embodiment of this invention, FIG. 8 is a timing chart showing an operation of the pixel part of FIG. 7. In passing, in FIG. 7, the same reference numerals and signs are given to the same elements as in FIG. 1, and explanations regarding those will be omitted here.

A solid-state image sensing apparatus of this third embodiment is different from the solid-state image sensing apparatus of the first embodiment on such a point that a switching device is disposed instead of the constant current source 114 which was connected to each vertical signal line 136 in the above-described first embodiment, and on such a point that a timing generator (not shown) which corresponds to the above-described timing generator 6 also controls the same switching device.

As shown in FIG. 7, the switching device is composed of a transistor 28 (N type MOSFET), and to a gate of the transistor 28, a load pulse 30 is inputted from the timing generator, and a source of the transistor 28 is connected to ground, and a drain is connected to the vertical signal line 136.

In the suchlike structure, the timing generator which configures the solid-state image sensing apparatus of the third embodiment, as shown in FIG. 8, prior to supplying sampling pulses to each sample hold circuit at timings T1*a*, T3, T5, outputs the load pulse 30 to the transistor 28 at timing T1*b*, T2*a*, T4*a*, respectively, and for a certain period, has the transistor 28 turned ON and connects the vertical signal line 136 to ground.

Therefore, in this solid-state image sensing apparatus, before a voltage which is outputted from the buffer circuit 130 to the vertical signal line 136 is taken in each sample hold circuit 2, electric charges which are stored in a parasitic capacitance which relates to the vertical signal line 136 are discharged, and after that, the vertical signal lien 136 is cut off from ground. And, right after the vertical signal line 136 was cut off from ground, a voltage of the vertical signal line 136 closes, little by little, to an output voltage of the buffer circuit 130, i.e., a voltage which reflected a voltage of the FD part 124, and coincides with the same voltage until timings T1*a*, T3, T5, and at these timings, the sample hold circuit 2, the first and second sample hold circuits 142, 144 hold a voltage of the vertical signal line 136 in the same manner as in case of the solid-state image sensing apparatus 1.

In this third embodiment, since there is usually no necessity that the transistor 28 is operating, as in case that it is operated as the constant current source 114, there is no necessity of holding such a state that a voltage of more than a certain value was applied between source/drain of the transistor 28. Thus, a minimum value of a voltage which can be inputted to the buffer circuit 130 becomes such a level of a threshold value of the transistor, and even if the channel voltages Vr1, Vr2 of the reset gate 128 are lowered, the pixel 120 becomes operable. On that account, in selecting the channel voltages Vr1, Vr2, a degree of freedom is increased. For example, in case that a voltage of the electric source Vdd is 2.5V, when a channel voltage of the reset gate 128 is defined by a current 1 nA, both of the channel voltages Vr1, Vr2 may be 1.0V.

As explained above, in the first-third embodiments of this invention, before the reset pulse is supplied to the reset gate, an output voltage of the buffer circuit is taken in the second signal path. In a stage before this reset pulse is supplied to the reset gate, in case that the amount of incident light to the photo diode is large, electric charges which the photo diode generated overflow from the photo diode and flow into the FD part, and further, overflow also in the FD part, and flow out to a predetermined electric potential point.

At this time, a voltage of the FD part is determined by a size of a current due to electric charges flown out to the predetermined electric potential point, but since the reset gate which is composed of a field effect transistor has a small current flowing in a channel and operates in a sub-threshold region, a voltage of the FD part becomes a value which corresponded to logarithm of a current value. And, since a voltage of the FD part is outputted through buffer means, and supplied to the second signal path, in case that the amount of incident light is large, a voltage which is supplied to the second signal path becomes a value which corresponded to logarithm of the amount of incident light.

That is, in the first-third embodiments of this invention, in case that the amount of incident light of the photo diode is large, a voltage which corresponded to logarithm of the amount of incident light is outputted from the second signal path, and thus, it is possible to realize a solid-state image sensing apparatus with a wide dynamic range.

Also, in this embodiment, since a capacitor etc. are not used for logarithm transformation, there occurs no problem of a residual image, and also, since it is possible to use the embedded photo diode with less noises, good image quality is obtained.

And, since there is no necessity of using a line memory, a frame memory, and of carrying out calculation processing between rows of the pixel part, a structure and a processing content are simple, which is advantageous to miniaturization of an apparatus, and there occurs no case that a manufacturing cost is particularly increased.

Further, since the pixel can be essentially made to be the same structure as in the past, there occurs no case that a size of the pixel part grows larger, and this point is also advantageous to miniaturization of a solid-state image sensing apparatus.

Also, there occurs no case that a light exposure period is out of alignment between a signal of a bright portion and a signal of a dark portion, and resolution is not also deteriorated.

Next, fourth-seventh embodiments of this invention will be explained with reference to the drawings.

Figure 9:
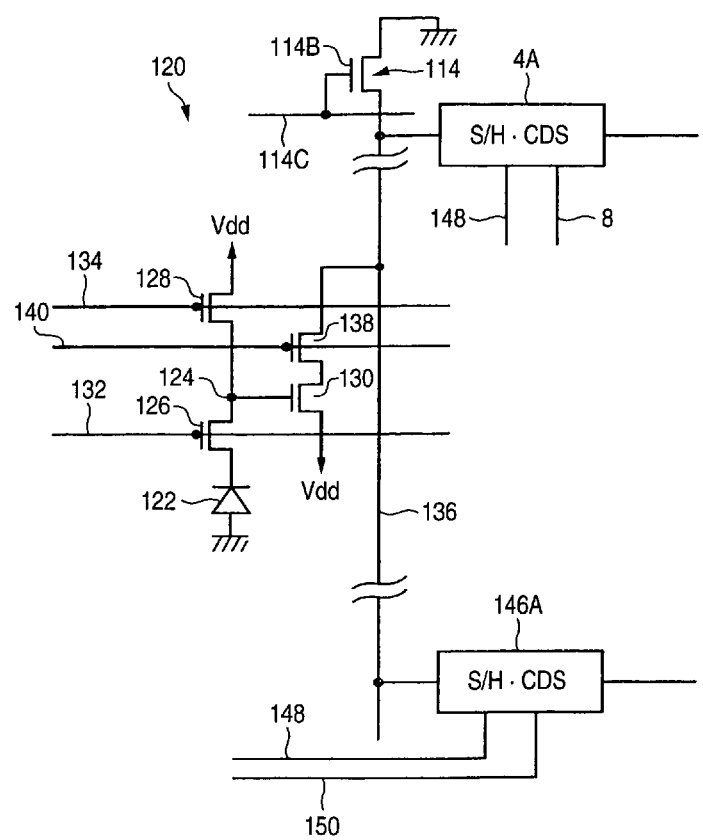
FIG. 9 is a circuit diagram showing a pixel part periphery which configures a solid-state image sensing apparatus according to a fourth embodiment of this invention.
Figure 10:
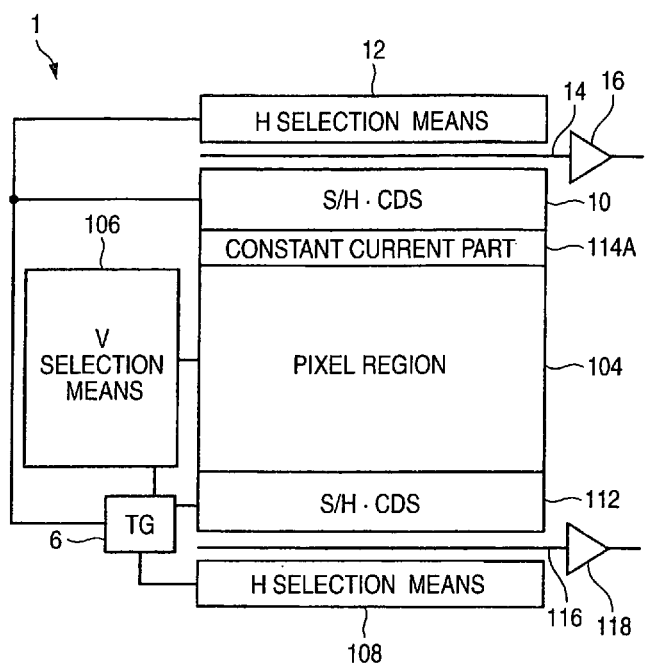
FIG. 10 is a block diagram showing the entirety of the solid-state image sensing apparatus shown in FIG. 9.
Figure 11:
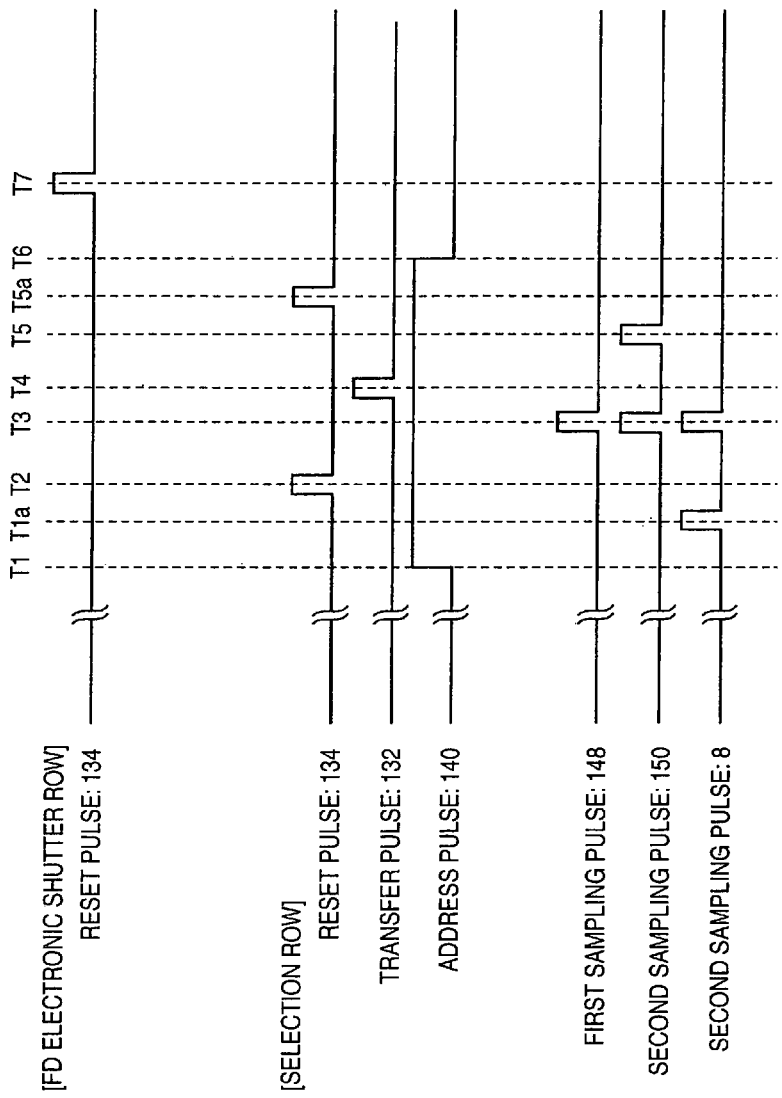
FIG. 11 is a timing chart showing an operation of a pixel part periphery shown in FIG. 9.

FIG. 9 is a circuit diagram showing a pixel periphery which configures a solid-state image sensing apparatus according to a forth embodiment of this invention, FIG. 10 is a block diagram showing the entirety of the solid-state image sensing apparatus shown in FIG. 9, FIG. 11 is a timing chart showing an operation which relates to a pixel of FIG. 9. In FIG. 9, FIG. 10, the same reference numerals and signs are give to the same elements as in FIG. 28, FIG. 29 (in this regard, however, in this embodiment, the S/H circuit and the CDS circuit are shown by one block, i.e., by S/H•CDS4A, 144A), detail explanations regarding those will be omitted here. Hereinafter, with reference to these drawings, one example of a solid-state image sensing apparatus according to this invention will be explained, and at the same time, an embodiment of a driving method of a solid-state image sensing apparatus according to this invention will be explained.

As shown in FIG. 9, FIG. 10, in the solid-state image sensing apparatus 1 of this embodiment, to each pixel column of the pixel region 104 in which the pixels 120 were disposed in a matrix shape, an S/H•CDS circuit 4A (second calculation means) is newly disposed. The S/H•CDS circuit 4A holds a voltage which is outputted to the vertical signal line 136, on the basis of the sampling pulse 8 and the first sampling pulse 148 from the timing generator 6 (FIG. 10), and calculates a difference of 2 voltages which were held at different timings, and removes an offset portion and outputs a signal component. In passing, the S/H•CDS circuit 4A is disposed in the S/H•CDS part 10 shown in FIG. 10.

In this embodiment, as shown in FIG. 10, the H selection means 12 as well as the S/H•CDS part 10 is newly disposed, and output signals of the S/H•CDS circuit 4A of the S/H•CDS part 10 are sequentially selected by the H selection means 12, and outputted through the horizontal signal line 14 from the output part 16. The output part 16 is configured in detail by an amplification circuit, an AGC circuit, an A/D converter and so on.

The timing generator 6, in the same manner as in the past, supplies timing pulses to the V selection means 106, the H selection means 108, the S/H•CDS part 112, and supplies timing pulses to the S/H•CDS part 10 and the H selection means 12. In this embodiment, the timing generator 6, the V selection means 106 configure first through third timing control means which relates to this invention.

The constant current source 114 (FIG. 9) is configured in detail by a MOS transistor 114B in which, as one example, a threshold voltage Vth is 0.45V, and its gate is connected to a power supply line 114C of 0.8V, and a source is connected to ground, respectively, and in case that the vertical signal line 136 is 0.4V and above, a constant current of approximately 10 µA is flowed in the vertical signal line 136. Since a capacitor is inserted serially into an input part of the S/H•CDS circuits 4A, 146A, there occurs no case that a direct current flows into the S/H•CDS circuit 4A, 146A side.

Next, an operation of the solid-state image sensing apparatus 1 of this embodiment will be explained with also reference to FIG. 1. In passing, in FIG. 11, the same reference numerals and signs are give to timings which correspond to the timings shown in FIG. 30.

The V selection means 106 selects a pixel row of the pixel region 104 on the basis of timing pulses from the timing generator 6, and to the pixel 120 which belongs to the selected row, at timing T1, the address pulse 140 (high level) is outputted. This address pulse 140 (control pulse which relates to this invention) is supplied to the address gate 138 in each pixel 120, and as a result, the address gate 138 is turned ON and an amplifying transistor 130 (buffer circuit which relates to this invention) is connected to the vertical signal line 136. At this time, since the amplifying transistor 130 forms a source follower circuit together with the constant current source 114, a gate voltage, i.e., a voltage which followed a voltage of the FD part 124 is outputted from the amplifying transistor 130 to the vertical signal line 136 with low impedance.

After that, the timing generator 6 operates as second timing control which relates to this invention, and at timing T1a, to the S/H•CDS part 10, outputs a second sampling pulse 8 (control pulse which relates to this invention), and has a voltage of the FD part 124 which is outputted through the amplifying transistor 130 to the vertical signal line 136, i.e., a second voltage which relates to this invention (hereinafter, also referred to as wide D voltage), held (the second timing control step which relates to this invention). As to what-like voltage the voltage which was held here is, it will be explained later in detail.

Next, the V selection means 106 outputs the reset pulse 134 at timing T2, and by this, the reset gate 128 is turned ON and the FD part 124 is connected to the electric source Vdd, and signal charges which are stored in the FD part 124 are excluded. And, a voltage of the FD part 124 in this reset state, i.e., an offset voltage (third voltage which relates to this invention) is outputted by the amplifying transistor 130 to the vertical signal line 136.

Subsequently, at timing T3, the timing generator 6 outputs the first and second sampling pulses 148, 150 to the S/H•CDS circuit 146A (first calculation means which relates to this invention) which were disposed with respect to each vertical signal line 136, and outputs the first sampling pulse 148 and the second sampling pulse 8 to the S/H•CDS circuit 4A, respectively, and has the above-described offset voltage, which was outputted by the amplifying transistor 130 to the vertical signal lien 136, held.

After that, at timing T4, the V selection means 106 outputs the transfer pulse 132, and has the transfer gate 126 turned ON, and has signal charges, which were stored due to light reception of the photo diode 122 after the previous transfer pulse 132 until the timing T4, transferred to the FD part 124. The FD part 124 generates a voltage which corresponded to an amount of signal charges transferred, i.e., a normal light detection voltage (first voltage which relates to this invention), and the amplifying transistor 130 outputs its voltage to the vertical signal line 136 with low impedance.

And, the timing generator 6, at timing T5, outputs the second sampling pulse 150 to each S/H•CDS circuit 146A which was disposed with respect to each vertical signal line 136, and at this time, has the above-described normal light detection voltage, which the amplifying transistor 130 outputs to the vertical signal line 136, held. By this, each S/H•CDS circuit 146A calculates a difference of the normal light detection voltage held as above and the offset voltage, and removes the offset portion, and outputs a voltage of a size which corresponds to the amount of incident light to the photo diode 122. Output signals of the S/H•CDS circuit 146A with respect to each vertical signal line 136 are sequentially selected by the H selection means 108 on the basis of timing pulses from the timing generator 6, and outputted to the horizontal signal line 116, and outputted as an image signal through the output part 118.

On one hand, in the S/H•CDS part 10, the S/H•CDS circuit 4A which was disposed with respect to each vertical signal line 136 calculates a difference of the wide D voltage held as above and the offset voltage, and removes an offset portion, and outputs a voltage of a size which corresponds to the amount of incident light to the photo diode 122. Output signals of the S/H•CDS circuit 4A with respect to each vertical signal line 136 are sequentially selected by the H selection means 12 on the basis of timing pulses from the timing generator 6, and outputted to the horizontal signal line 14, and outputted as an image signal through the output part 16.

The V selection means 106, in order to be prepared for a next cycle, at timing T5a, outputs the reset pulse 134 again. By this, the reset gate 128 is turned ON and the FD part 124 is connected to the electric source Vdd, and signal charges which are stored in the FD part 124 are excluded.

The V selection means 106 returns the address pulse 140 to a low level at timing T6, and as a result, the address gate 138 is turned OFF and the amplifying transistor 130 is cut off from the vertical signal line 136, and an operation regarding the pixel 120 which is of 1 row portion is completed.

In the above operations, the V selection means 106 and the timing generator 6 operate as the first timing control means which relates to this invention, and supply the address pulse 140 to a pixel of the selected row at timing T1, and has the FD part 124 reset at timing T2, and has signal charges which the photo diode 122 generated transferred to the FD part 124 at timing T4, and has the normal light detection voltage outputted to the vertical signal line, and , at this time, the first timing control step which relates to this invention is carried out.

Subsequently, the V selection means 106 operates together with the timing generator 6 as the third timing control means which relates to this invention, and to each pixel of a pixel low (FD electronic shutter row) which was advanced by 5 rows as one example, from the selected row which was selected until timings T1-T6, at timing T7, the reset pulse 134 is outputted, and the FD part 124 is reset (third timing control step which relates to this invention).

Figure 12:
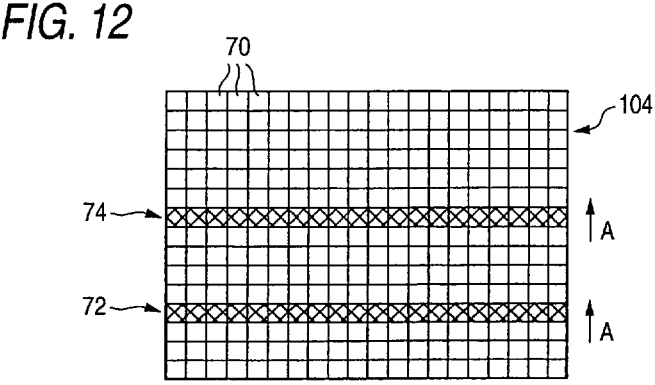
FIG. 12 is an explanatory view showing a relation of an FD electronic shutter row and a selected row of the solid-state image sensing apparatus shown in FIG. 10.

FIG. 12 is an explanatory view showing a relation of the FD electronic shutter row and the selected row, and the pixel region 104 is schematically shown, and each quadrangle 70 represents each pixel. And, for example, a selected row 72 is a row which was selected until the above-described timings T1-T6, and an FD electronic shutter row 74 at timing T7, is a row in which the reset pulse 134 is supplied to the FD part 124 of each pixel as described above.

Here, the FD electronic shutter row 74 is selected after 4 rows following the selected row 72 were selected, and becomes the selected row, and in this selected row (FD electronic shutter row 74), the same operation as the operation regarding the selected row 72 which was carried out in the above-described timings T1-T6 is carried out. Therefore, to reset the FD part 124 which configures a pixel of the FD electronic shutter row 74 at timing T7 means to reset the FD part 124 of each pixel of this pixel row, in advance of the pixel row (FD electronic shutter row 74) being later selected by the V selection means 106.

The above-described operations regarding the selected row 72 and the FD electronic shutter row 74 are carried out over sequentially shifting the selected row 72 and the FD electronic shutter row 74 in a direction of an arrow A one row by one row, and when the V selection means 106 selected all rows, image signals which are of one sheet portion which were generated by all pixels 120 are to be outputted.

Next, the above-described wide D voltage which was sampled at timing T1a, and reset of the FD part 124 in the above-described FD electronic shutter row 74 will be explained in detail.

In case that the amount of incident light to the photo diode 122 is large, excessive signal charges which were generated due to light reception of the photo diode 122 overrun the transfer gate 126, and overflow into the FD part 124, and further, they also overflow the FD part 124, and the signal charges overrun the reset gate 128 and flow into the electric source Vdd.

At this time, a voltage of the FD part 124 is determined by a size of a current due to signal charges which flow out to the electric source Vdd, but the amount of signal charges which the photo diode 122 generates is small, and a current flowing through a channel of the reset gate 128 which is made by a MOSFET is a weak current with an order of nano ampere, and the reset gate 128 operates in the sub-threshold region, and therefore, the voltage of the FD part 124 becomes a value which corresponded to logarithm of a current value. And, since this voltage of the FD part 124 is outputted through the amplifying transistor 130, and supplied to the S/H•CDS circuit 4A, in case that the amount of incident light is excessive, at timing T1a, the wide D voltage which the S/H•CDS circuit 4A holds becomes a value which corresponded to logarithm of the amount of incident light.

However, in this embodiment, the FD part 124 of each pixel of the FD electronic shutter row 74, as described above, in advance of being selected, is reset in advance at a stage of 5 rows before. Therefore, after reset of the FD part 124, signal charges which were overflowed from the photo diode 122 are gradually stored in the FD part 124, but in a stage that the selected row was shifted by 5 rows, the wide D voltage of a size which was in proportion to the amount of signal charges which were stored in the FD part 124 during this period is taken in the S/H•CDS circuit 4A. In this manner, in this embodiment, since electric charge storage time in the FD part 124 is shortened, even in case that the amount of incident light is excessive and signal charges from the photo diode 122 overflowed, it is possible to obtain a voltage (wide D voltage) which varies linearly to the amount of overflowed signal charges.

Thus, by generating image signals by use of signals which the S/H•CDS circuit 146A generates with the normal light detection voltage and which are outputted through the output part 118 in case that the amount of incident light is of a normal size, and by use of signals which the S/H•CDS circuit 4A generates with the wide D voltage and which are outputted from the output part 16 in case that the amount of incident light is excessive, it is possible to obtain image signals which vary in size linearly to the amount of incident light even in case that the amount of incident light is excessive, and shooting with a wide dynamic range becomes possible.

In passing, when the amount of incident light is further greater, signal charges which overflowed from the photo diode 122 overflow in a stage before timing T1a also in the FD part 124 after reset, and as described above, flow through the reset gate 128, and therefore, the wide D voltage becomes a value which corresponded to logarithm of the amount of incident light. Therefore, the image signals which vary in size proportionally to the amount of incident light is not obtained but, image signals with a size which corresponded to the amount of incident light are obtained, and also in this case, shooting with a wide dynamic range becomes possible.

Also, in this embodiment, as described above, since signals can be outputted from the output parts 16, 118 at the same time, it is possible to select to use both outputs, or to use only one, according to need and degree of freedom is high in signal processing of a subsequent stage.

And, there is no necessity of using a line memory, a frame memory, and of carrying out calculation processing between rows of the pixel region 104, a structure and a processing content are simple, which is advantageous to miniaturization of an apparatus, and there occurs no case that a manufacturing cost is particularly increased.

Further, since a structure of the pixel 120 is the same as in the past, there occurs no case that a size of the pixel 120 grows larger, and this point is also advantageous to miniaturization of a solid-state image sensing apparatus.

Also, in case that the amount of incident light is extremely large, and an output of the output part 16 becomes a size which corresponded to logarithm of the amount of incident light, since a capacitor etc. are not used for logarithm transformation, there occurs no problem of a residual image, and also, since it is possible to use the embedded photo diode 122 with less noises, there also occurs no case that performance is lowered on a point of image quality.

In passing, in this embodiment, as shown in FIG. 12, it was explained that the FD electronic shutter row 74 goes ahead by 5 rows from the selected row 72, but by variously changing an interval of these rows, it is possible to change electric charge storage time in the FD part 124, and it is possible to adjust a range of the amount of light in which the wide D voltage which varies linearly to the amount of incident light can be obtained in case that the amount of incident light is excessive. The narrower the above-described interval between rows is made, the range of the amount of light in which the wide D voltage which varies linearly to the amount of incident light can be obtained is widened, and for example, in case that 1 frame is composed of 500 pixel rows, assuming that the FD electronic shutter row 74 is a next row of the selected row 72, it is expanded 500 times as compared to such a case that reset of the FD part 124 was not carried out by the FD electronic shutter row 74.

Also, in this embodiment, it was explained that electrons are carriers, but also, in case that a P type MOSFET is used as a MOSFET which configures each gate etc., and positive holes are made to be carriers, essential operations do not change, and the same operation and effects are obtained.

And, here, shown was the embodiment in case that the timing generator was built in, but it is also possible to make the timing generator external.

Next, a fifth embodiment of this invention will be explained.

Figure 13:
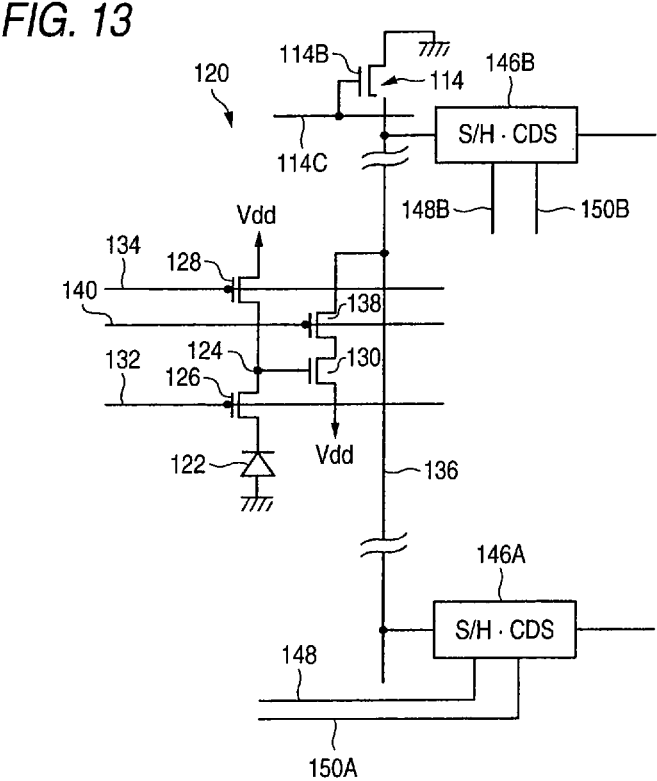
FIG. 13 is a circuit diagram showing a pixel part periphery which configures a solid-state image sensing apparatus according to a fifth embodiment of this invention.
Figure 14:
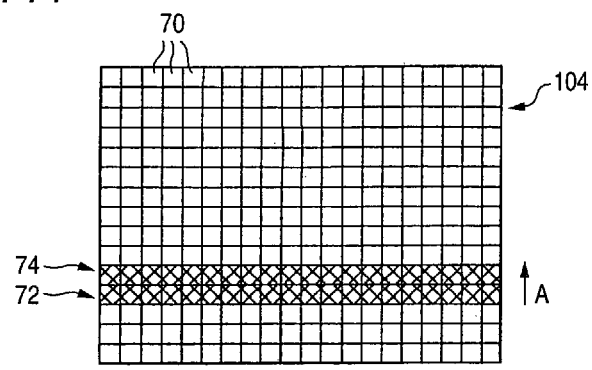
FIG. 14 is an explanatory view showing a relation of an FD electronic shutter row and a selected row in the fifth embodiment shown in FIG. 13.
Figure 15:
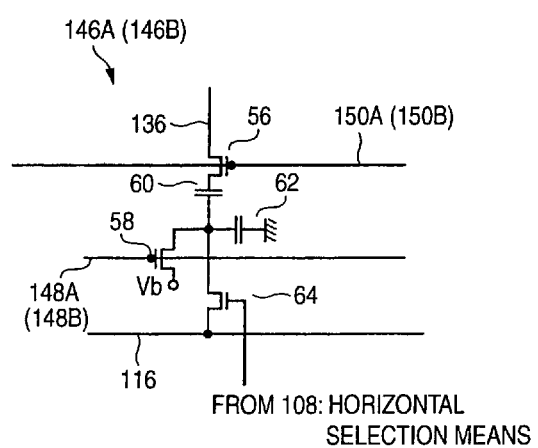
FIG. 15 is a circuit diagram showing in detail an S/H•CDS circuit in the fifth embodiment shown in FIG. 13.
Figure 16:
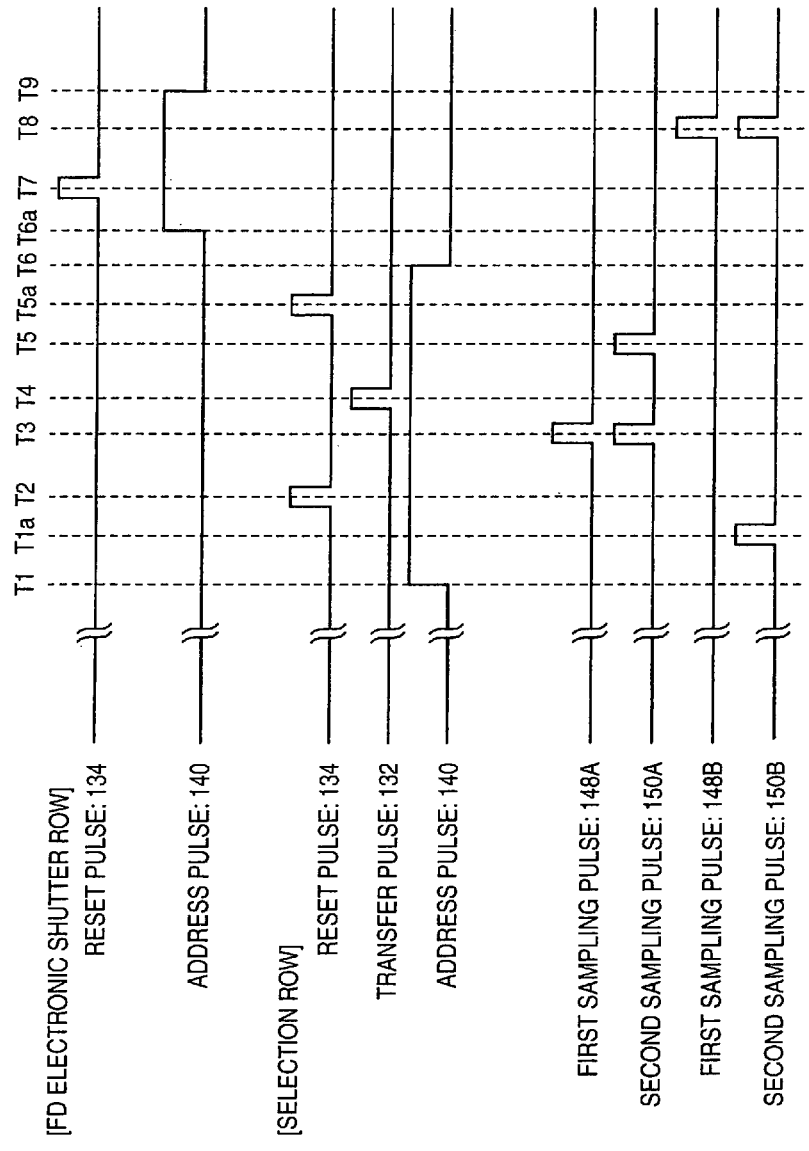
FIG. 16 is a timing chart showing an operation of a pixel part in the fifth embodiment shown in FIG. 13.

FIG. 13 is a circuit diagram showing a pixel periphery which configures a solid-state image sensing apparatus according to a fifth embodiment of this invention, FIG. 14 is an explanatory view showing a relation of the FD electronic shutter row 74 and the selected row 72 in the fifth embodiment, FIG. 15 is a circuit diagram showing in detail the S/H•CDS circuit, FIG. 16 is a timing chart showing a operation of this fifth embodiment. In the figures, the same reference numerals and signs are given to the same elements as in FIG. 9, FIG. 12 and so on. In passing, since an overall structure of this fifth embodiment is the same as the structure of the solid-state image sensing apparatus 1 shown in FIG. 10, FIG. 10 is also referred at pleasure. Hereinafter, with reference to these drawings, a solid-state image sensing apparatus as the fifth embodiment of this invention will be explained, and at the same time another example of a driving method of a solid-state image sensing apparatus of this invention will be explained.

The solid-state image sensing apparatus of this fifth embodiment is, as shown in FIG. 14, different from the solid-state image sensing apparatus 1 of the above-described embodiment on such a point that the FD electronic shutter row 74 is made to be a next row of the selected row 72, and as shown in FIG. 13, the S/H•CDS circuit 4A which configures the above-described fourth embodiment is substituted with a S/H•CDS circuit 146B of the same structure as the S/H•CDS circuit 146A, and further, as described as follows, of take-in timing of the offset voltage to the S/H•CDS circuit 146B Firstly, with reference to FIG. 15, the S/H•CDS circuit 146A (146B) will be explained in detail.

As shown in FIG. 15, the S/H•CDS circuit 146A (146B) is configured by including transistors 56, 58, capacitors 60, 62, and a horizontal selection transistor 64. A drain of the transistor 56 is connected to the vertical signal line 136, and a source is connected to one end of the capacitor 60, respectively, and to a gate of the transistor 56, a second sampling pulse 150A (150B) is supplied from the timing generator 6. Also, a drain of the transistor 58 is connected to a bias voltage source Vb, and a source is connected to the other end of the capacitor 60, respectively, and to a gate, a first sampling pulse 148A is supplied from the timing generator 6. In passing, the above-described first and second sampling pulses 148A, 150A (148B, 150B) are supplied in common to gates of the transistors 56, 58 of the all S/H•CDS part 146A which were disposed in the S/H•CDS part 112.

Between the above-described other end of the capacitor 60 and ground, the capacitor 62 is connected, and to the above-described other end of the capacitor 60, a drain of the horizontal selection transistor 64 is further connected. A source of the horizontal selection transistor 64 is connected to the horizontal signal line 116, and to a gate, selection pulses are individually supplied from the H selection means 108 with respect to each S/H•CDS circuit 146A.

In the suchlike structure, when the first and second sampling pulses 148A, 150A are supplied, both of the transistors 56, 58 are turned ON, and by this, a voltage which is outputted to the vertical signal line 136 and which corresponds to the offset voltage of the FD part 124 is held in the capacitor 60.

On one hand, when only the second sampling pulse 150A is supplied, the transistor 56 is turned ON, and a light detection voltage which is outputted to the vertical signal line 136 is applied to the capacitor 62 through the transistor 56 and the capacitor 60. Here, since the capacitor 60 is holding a voltage which corresponds to the offset voltage, the capacitor 62 is to hold a voltage which corresponds to such a voltage that this voltage was subtracted.

And, the H selection means 108 outputs selection pulses sequentially to the horizontal selection transistor 64 of the S/H•CDS circuit 146A with respect to each vertical signal line 136, and has the horizontal selection transistor 64 turned ON sequentially, and has a voltage which the capacitor 62 is holding outputted to the horizontal signal line 116 in a sequential order.

In passing, the S/H•CDS circuit 146B becomes the same structure as the S/H•CDS circuit 146A in this embodiment.

Next, centrally to taking the wide D voltage, the offset voltage, the normal light detection voltage in the S.H.CDS circuits 146A, 146B, with also reference to FIG. 16, an operation will be explained. What the timing chart shown in FIG. 16 is different from the timing chart shown in FIG. 11 is such a point that the first and second sampling pulses 148B, 150B are not supplied to the S/H•CDS circuit 146B at timing T3, and are supplied at timing T8, and also, the address pulse 140 is supplied at timing T6a. Since other points than these are the same as in FIG. 11, and also, related operations are the same, here, operations at these timings will be centrally explained.

As described above, at timing T3, the first and second sampling pulses 148B, 150B are not supplied to the S/H•CDS circuit 146B, and the timing generator 6 supplies the first and second sampling pulses 148A, 150A only to the S/H•CDS circuit 146A, and has the offset voltage of the FD part 124 which is outputted to the vertical signal line 136, held. Concretely speaking, as shown in FIG. 15, at this time, both of the transistors 56, 58 are turned ON, and a voltage which corresponds to the above-described offset voltage was held in the capacitor 60.

After that, to the S/H•CDS circuit 146A, in the same manner as in the case of the solid-state image sensing apparatus 1, at timing T5, the second sampling pulse 150A is supplied, and the S/H•CDS circuit 146A holds a normal light detection voltage. Concretely speaking, as shown in FIG. 15, at this time, the transistor 56 is turned ON, and the capacitor 62 holds a voltage which corresponds to such a voltage that the above-described offset voltage was subtracted from the normal light detection voltage, and this voltage is outputted later through the transistor 64 to the horizontal signal line 116.

And, the V selection means 106 operates together with the timing generator 6 as the third timing control means which relates to this invention, and to the address gate 138 which configures a pixel of the FD electronic shutter row 74 shown in FIG. 14, firstly at timing T6a, the address pulse 140 is supplied so as to have the address gate 138 turned ON, and next, at timing T7, in the same manner as in the case of the solid-state image sensing apparatus 1, the reset pulse 134 is supplied to the reset gate 128 so as to have the FD part 124 reset.

And, at timing T8, the timing generator 6 outputs the first and second sampling pulses 148B, 150B to each S/H•CDS circuit 146B so as to have the offset voltage (fourth voltage which relates to this invention) of the FD part 124 which is outputted to the vertical signal line 136, held. Concretely speaking, as shown in FIG. 15, at this time, both of the transistors 56, 58 are turned ON, and a voltage which corresponds to the above-described offset voltage is held in the capacitor 60. The V selection means 106 subsequently returns the address pulse to an original low level at timing T9.

After that, when the current FD electronic shutter row 74 becomes a selected row in a next cycle, the timing generator 6, in the same manner as in the case of the solid-state image sensing apparatus 1, supplies the second sampling pulse 150B to each S/H•CDS circuit 146B at timing T1a so as to have the wide D voltage which is outputted to the vertical signal line 136, held.

Concretely speaking, as shown in FIG. 15, at this time, the transistor 56 is turned ON, and the capacitor 62 holds a voltage which corresponds to such a voltage that the above-described offset voltage was subtracted from the wide D voltage, and this voltage is outputted later through the transistor 64 to the horizontal signal line 116.

Thereafter, over having the selected row 72 and the FD electronic shutter row 74 shifted one row by one row in a direction of an arrow A sequentially, operations as described above are repeated.

As explained above, in the solid-state image sensing apparatus of the fifth embodiment of this invention, to both circuits of the S/H•CDS circuits 146A, 146B, the offset voltage is supplied in advance, and after that, the normal light detection voltage and the wide D voltage are supplied, respectively. Therefore, the S/H•CDS circuits 146A, 146B, as shown in FIG. 15, can be made to be completely the same structure and it is possible to obtain such a voltage of the same polarity that the offset voltage was subtracted from the normal light detection voltage and the wide D voltage, respectively.

In case of the S/H•CDS circuit 4A shown in FIG. 9, since the wide D voltage is firstly supplied at timing T1a as described above, and after that, at timing T3, the offset voltage of the FD part 124 is supplied, in case that the S/H•CDS circuit 4A is made to be the same structure as the S/H•CDS circuit 146A, a voltage which corresponds to the wide D voltage is held in the capacitor 60, and therefore, from the S/H.CES circuit 4A, a signal with a reverse polarity is to be outputted. Therefore, the S/H•CDS circuit 4A has to be made to be a structure which is different from the S/H•CDS circuit 146A, in order that a polarity of an output signal is made to be the same as the S/H•CDS circuit 146A.

In contrast to this, in this fifth embodiment, as described above, there occurs no problem even if the S/H•CDS circuit 146B is of the same structure as the S/H•CDS circuit 146A, and from the both circuits, signals with the same polarity are outputted. On that account, design of the S/H•CDS circuit is easy, which is advantageous also in manufacturing.

Also, in this fifth embodiment, as described above, at timing T7, the FD part 124 of a pixel of the FD electronic shutter row is reset and at timing T8, the offset voltage is held in the S/H•CDS circuit 146B, and right after that, the wide D voltage is taken in the S/H•CDS circuit 146B, at timing T1a, from a pixel of a next selected row (i.e., the above-described FD electronic shutter row) so as to obtain a signal which corresponds to the wide D voltage from which the offset portion was removed. Therefore, it is possible to effectively remove noises such as KTC noise etc. which are included in the wide D voltage.

That is, when the FD part 124 of a pixel of the FD electronic shutter row was reset at timing T7, a voltage (offset voltage) of the FD part 124 becomes one in which noises such as KTC noise etc. were overlaid. After that, signal charges which overflow from the photo diode 122 are stored in the FD part 124, and the FD part 124 generates a corresponding voltage, but in this voltage, noises after the above-described reset are overlaid. Thus, at timing T1a of a next cycle, the wide D voltage in which the same noises as the noises which were overlaid in the offset voltage were overlaid is taken in the S/H•CDS circuit 146B, and the offset voltage right after the reset which is taken in at timing T8 in advance is subtracted, and thereby, it is possible to surely remove a noise component.

In passing, in this fifth embodiment, since the selected row and the FD electronic shutter row are adjacent to each other and a positional relationship of the both rows is fixed, it is not possible to carry out adjustment of storage time of signal charges which overflowed from the photo diode 122 in the FD part, and it is not possible to carry out adjustment of sensitivity in case that the amount of incident light is excessive. However, since, by setting the FD electronic shutter row to a next row of the selected row, a dynamic range is most widened, to fix the FD electronic shutter row in this manner does not necessarily become disadvantageous. Also, to fix sensitivity in case that the amount of incident light is excessive works advantageously on such a point that signal processing in a subsequent stage becomes easy.

Next, a sixth embodiment of this invention will be explained.

Figure 17:
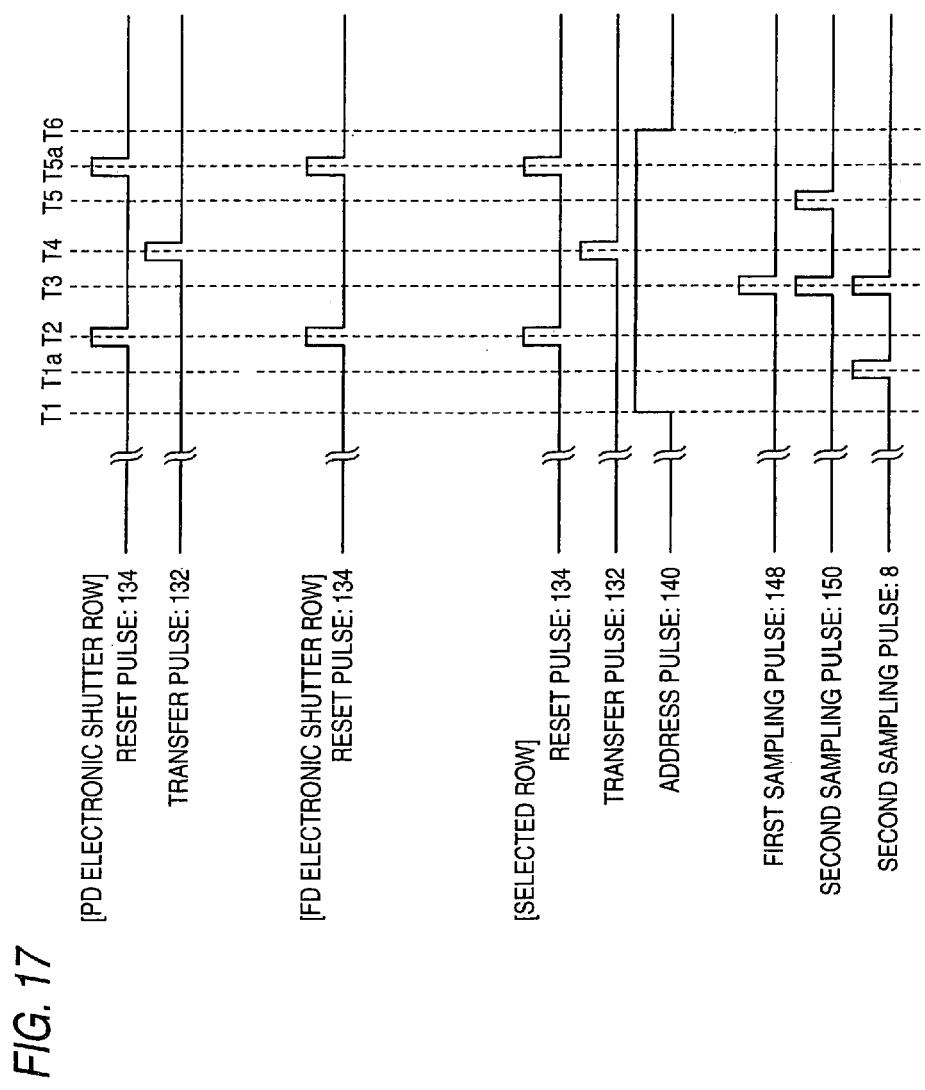
FIG. 17 is a timing chart showing an operation of a pixel part in the sixth embodiment of this invention.
Figure 18:
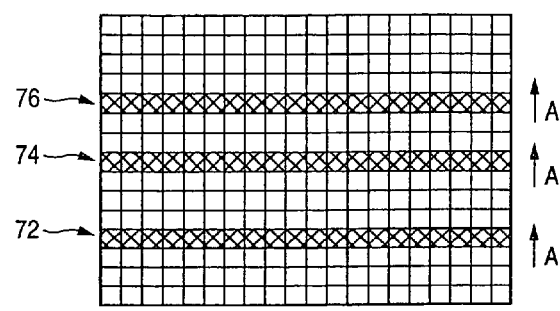
FIG. 18 is an explanatory view showing a relation of a photo diode advance reset row, an FD electronic shutter row, and a selected row of the sixth embodiment shown in FIG. 17.

FIG. 17 is a timing chart showing an operation of this sixth embodiment, FIG. 18 is an explanatory view showing a relation of a photo diode electronic shutter row, an FD electronic shutter row, and selected row in this sixth embodiment. In passing, in FIG. 18, the same reference numerals and signs are give to the same elements as in FIG. 12. Hereinafter, with reference to these drawings, a solid-state image sensing apparatus as the sixth embodiment of this invention will be explained, and at the same time, another example of a driving method of a solid-state image sensing apparatus of this invention will be explained.

In passing, since an overall structure of the solid-state image sensing apparatus of the sixth embodiment and a structure of a pixel are the same as in the solid-state image sensing apparatus 1 of the fourth embodiment, FIG. 9, FIG. 10 are also referred at pleasure.

This sixth embodiment is, as shown in FIG. 18, different from the above-described solid-state image sensing apparatus 1 on such a point that a photo diode electronic shutter row 76 is set as well as the FD electronic shutter row 74, and timing control by the timing generator 6 and the V selection means 106 was changed. The FD electronic shutter row 74 is, in this embodiment, in a position which is ahead by 4 rows from the selected row 72, and the photo diode electronic shutter row 76 is in a position which is ahead by 7 rows from the selected row 72.

Explaining as to an operation of this embodiment, the V selection means 106 (FIG. 10) outputs the address pulse 140 (high level) to each pixel of the selected row 72 at timing T1. As a result, the address gate 138 (FIG. 9) is turned ON and the amplifying transistor 130 is connected to the vertical signal line 136.

After that, the timing generator 6 outputs the sampling pulse 8 to the S/H•CDS circuit 4A at timing T1a, and has the wide D voltage which is outputted through the amplifying transistor 130 to the vertical signal line 136, held.

Next, the V selection means 106 outputs the reset pulse 134 to each row of the selected row 72, the FD electronic shutter row 74, the photo diode electronic shutter row 76 at timing T2. By this, in each pixel of the above-described 3 rows, the reset gate 128 is turned ON and the FD part 124 is reset. In the selected row 72, a voltage of the FD part 124 in this reset state, i.e., the offset voltage is outputted by the amplifying transistor 130 to the vertical signal line 136.

Subsequently, at timing T3, the timing generator 6 outputs the first and second sampling pulses 148, 150 to the S/H•CDS circuit 146A which was disposed with respect to each vertical signal line 136, and outputs the first sampling pulse 148 and the second sampling pulse 8 to the S/H•CDS circuit 4A, respectively, and has the above-described offset voltage, which was outputted by the amplifying transistor 130 of the selected row 72 to the vertical signal lien 136, held.

After that, at timing T4, the V selection means 106 supplies the transfer pulse 132 to the transfer gate which configures a pixel of the selected row 72 and the photo diode electronic shutter row 76 so as to have it turned ON, and has signal charges, which were stored due to light reception of the photo diode 122 until this timing, transferred to the FD part 124. The FD part 124 of each pixel of the selected row 72 generates the normal light detection voltage, and the amplifying transistor 130 outputs that voltage to the vertical signal line 136 with low impedance.

And, the timing generator 6, at timing T5, outputs the second sampling pulse 150 to each S/H•CDS circuit 146A, and at this time, has the above-described normal light detection voltage, which the amplifying transistor 130 outputs to the vertical signal line 136, held. By this, each S/H•CDS circuit 146A subtracts the offset voltage from the normal light detection voltage which was held as described above, and outputs a voltage of a size which corresponds to the amount of incident light to the photo diode 122. Output signals of the S/H•CDS circuit 146A with respect to each vertical signal line 136 are sequentially selected by the H selection means 108 on the basis of timing pulses from the timing generator 6, and outputted to the horizontal signal line 116, and outputted as an image signal through the output part 118.

On one hand, in the S/H•CDS part 10, each S/H•CDS circuit 4A subtracts the offset voltage from the wide D voltage which was held as described above, and outputs a voltage of a size which corresponds to the amount of incident light to the photo diode 122. Output signals of each S/H•CDS circuit 4A are sequentially selected by the H selection means 12 on the basis of timing pulses from the timing generator 6, and outputted to the horizontal signal line 14, and outputted as an image signal through the output part 16.

The V selection means 106, in order to be prepared for a next cycle, at timing T5a, outputs the reset pulse 134 again to the selected row 72, the FD electronic shutter row 74, and the photo diode electronic shutter row 76. By this, the reset gate 128 which configures a pixel of each row is turned ON and the FD part 124 is reset. In passing, since the transfer pulse 132 is supplied to a pixel of the photo diode electronic shutter row 76 at timing T4, both of the photo diode 122 and the FD part 124 which configure a pixel of the photo diode electronic shutter row 76 become in a reset state in this stage.

The V selection means 106 returns the address pulse 140 which was supplied to a pixel of the selected row 72 to a low level at timing T6, and as a result, the address gate 138 which configures a pixel of the selected row 72 is turned OFF and the amplifying transistor 130 is cut off from the vertical signal line 136. The V selection means 106, thereafter, carries out the suchlike operation over shifting the selected row 72, the FD electronic shutter row 74, and the photo diode electronic shutter row 76 one row by one row in a direction of an arrow A (FIG. 18) sequentially.

In the above operations, the photo diode electronic shutter row 76 shown in FIG. 18 is selected after 6 rows following the selected row 72 were selected, and becomes a selected row, and in that stage, the same operations as the operations regarding the selected row 72 shown in FIG. 18 which were carried out at the above-described timings T1-T6 are carried out in the photo diode electronic shutter row 76 (new selected row 72). Therefore, at timing T4, to have signal charges of the photo diode 122 transferred to the FD part 124, by supplying the transfer pulse 132 to a pixel of the photo diode electronic shutter row 76 and further, at timing T5a, to reset the FD part 124 by supplying the reset pulse at timing T5a means to reset the photo diode 122 and the FD part 124 of that pixel, in advance of a pixel row (photo diode electronic shutter row 76) being selected by the V selection means 106 later (fourth timing control step which relates to this invention). Here, the V selection means 106 which supplies the transfer pulse and the reset pulse to the photo diode electronic shutter row 76 is operating as the fourth timing control means which relates to this invention together with the timing generator 6.

In this manner, in the sixth embodiment, since the photo diode electronic shutter row 76 is set and the photo diode 122 is reset in advance, the electric charge storage time in the photo diode 122 becomes time which corresponds to the number of rows from the selected row 72 up to the photo diode electronic shutter row 76. Thus, by variously adjusting this number of rows, it is possible to change electric charge storage time in the photo diode 122, and the same advantages can be obtained as in the fourth embodiment and in addition to that, it becomes possible to carry out adjustment of sensitivity to the amount of incident light with a normal level.

In passing, in this sixth embodiment, it was configured that the reset pulse 134 is supplied also at timing T2 to a pixel of the FD electronic shutter row 74, but it may be configured such that the reset pulse is not supplied at this timing, and the reset pulse is supplied only at timing T5*a,* and also in that case, it is possible to reset the FD part 124 in advance, in preparation of the FD electronic shutter row 74 being selected later. Also, as in the case of the fourth embodiment, it is of course possible to reset the FD part 124 at timing after timing T6.

In this regard, however, on such a point that timing control is applied in common to a pixel of each row of the selected row 72, the FD electronic shutter row 74, and the photo diode electronic shutter row 76, and design is made to be easy, to adopt a system of supplying a reset pulse at the same timing as the selected row 72 etc. to the FD electronic shutter row 74 is advantageous.

Further, in the sixth embodiment, it was configured such that, to a pixel of the photo diode electronic shutter row 76, at the same timing as a pixel of the selected row 72, the reset pulse 134 and the transfer pulse 132 are supplied, but since the suchlike timing control to the photo diode electronic shutter row 76 aims to reset the photo diode 122 and the FD part 124 of the photo diode electronic shutter row 76 in advance, it is of course possible to configure to reset the photo diode 122 and the FD part 124 at timing which is different from that of the selected row 72.

Next, a seventh embodiment of this invention will be explained.

Figure 19:
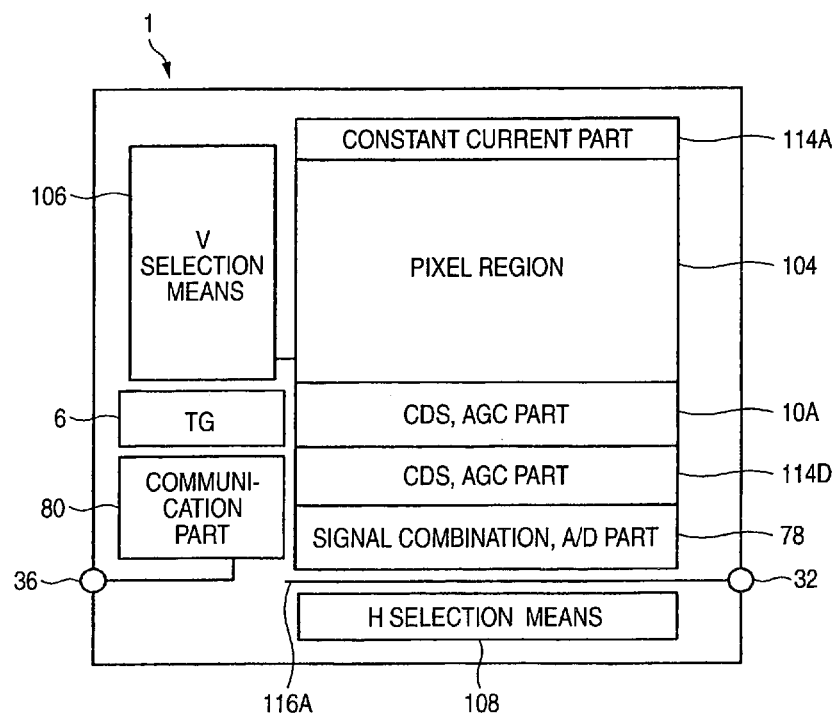
FIG. 19 is a block diagram showing the entirety of a solid-state image sensing apparatus in a seventh embodiment of this invention.

FIG. 19 is a block diagram showing the entirety of a solid-state image sensing apparatus as the seventh embodiment of this invention. In the figure, the same reference numerals and signs are given to the same elements as in FIG. 10.

In the solid-state image sensing apparatus 1 of this embodiment, instead of the S/H•CDS parts 10, 112 shown in FIG. 9, CDS•AGC parts 10A, 114D are disposed, and also, a signal combination•A/D conversion part 78, a communication part 80 are newly disposed, and further, the horizontal signal line 116 is substituted by a bus line 116A.

The CDS•AGC parts 10A, 114D are ones in which a function of AGC (Automatic Gain Control) was added to the S/H•CDS parts 10, 112 of FIG. 10, and after level adjustment was applied to the wide D voltage from which the offset portion was removed and the normal light detection voltage, these voltages are outputted, respectively.

And, the signal combination•A/D conversion part 78 combines the wide D voltage and the normal light detection voltage from the CDS•AGC part 10A, 114D so as to make 1 light detection voltage with a wide dynamic range, and further, converts it into a digital signal to be outputted. This digital signal is read out by the H selection means 108 sequentially to a bus line, and outputted through a digital output terminal 32.

The communication part 80, on the basis of a mode control signal which is inputted through a mode control terminal 36, controls an operation of the timing generator 6 and controls a drive mode of the solid-state image sensing apparatus 1.

Therefore, in the solid-state image sensing apparatus 1 of this seventh embodiment, since a light detection result in case that the amount of incident light to the photo diode is of a normal level, and a light detection result in case that it is excessive are outputted in a combined state, there is no necessary of providing a circuit for signal combination outside. Also, it is possible to variously control the operation of the solid-state image sensing apparatus 1 through the communication part 80, and flexibility in operation increases.

As explained above, in the solid-state image sensing apparatus according to the fourth-seventh embodiments of this invention, before the electric charge conversion means is reset by control of the first timing control means in a pixel of the selected row, by control of the second timing control means, the second voltage which the electric charge conversion means is generating is outputted through the buffer means to the signal line. Also, in advance of a pixel row being selected by the first timing control means, the electric charge conversion means of each pixel of a pixel row is reset in advance under control by the third timing control means. Therefore, the above-described second voltage is such a voltage that, in case that the amount of incident light is excessive, after the electric charge conversion means was reset by control of the third timing control means, excessive signal charges which the photo diode generated overflow, and are moved to and stored in the electric charge conversion means, and as a result, the electric charge conversion means generated.

That is, in the solid-state image sensing apparatus of this embodiment, even in case that the amount of incident light is excessive and signal charges which the photo diode generated overflowed from the photo diode to the electric charge conversion means, a voltage which varies linearly to the amount of overflowed signal charges is generated by the electric charge conversion means, and outputted to the signal line as the second voltage. Thus, by generating image signals by use of the above-described first voltage in case that the amount of incident light is of a normal size, and by use of the second voltage in case that the amount of incident light is excessive, it is possible to obtain image signals which vary in size linearly to the amount of incident light even in case that the amount of incident light is excessive, and shooting with a wide dynamic range becomes possible.

And, there is no necessity of using a line memory, a frame memory, and of carrying out calculation processing between rows of a pixel row, a structure and a processing content are simple, which is advantageous to miniaturization of an apparatus, and there occurs no case that a manufacturing cost is particularly increased.

Further, since a structure of the pixel is the same as in the past, there occurs no case that a size of a pixel grows larger, and this point is also advantageous to miniaturization of a solid-state image sensing apparatus.

Also, in case that the amount of incident light is extremely large, and the above-described second voltage becomes a size which corresponded to logarithm of the amount of incident light, since a capacitor etc. are not used for logarithm transformation, there occurs no problem of a residual image, and, since it is possible to use an embedded photo diode with less noises, there also occurs no case that performance is lowered on a point of image quality.

Next, eighth-tenth embodiments of this invention will be explained.

Figure 20:
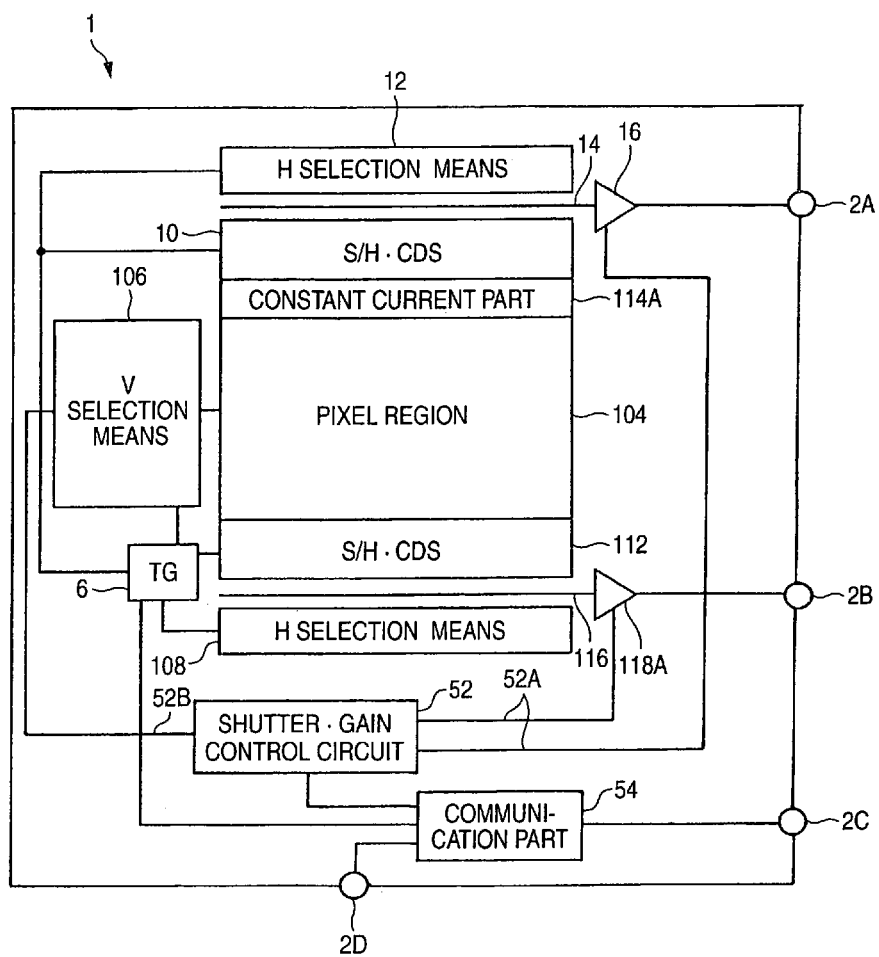
FIG. 20 is a block diagram showing the entirety of a solid-state image sensing apparatus in an eighth embodiment of this invention.
Figure 21:
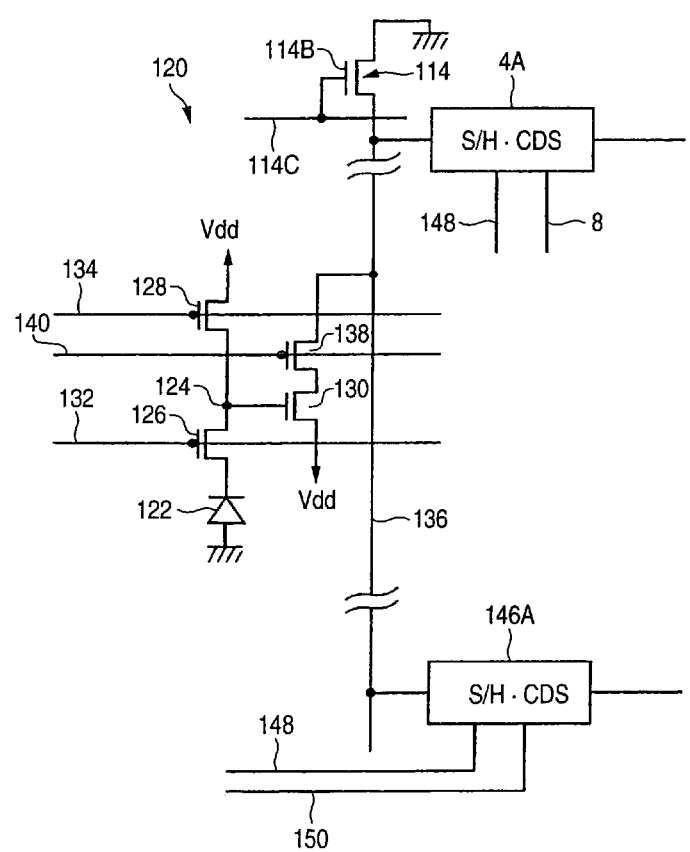
FIG. 21 is a circuit diagram showing a pixel part periphery which configures the solid-state image sensing apparatus shown in FIG. 20.
Figure 22:
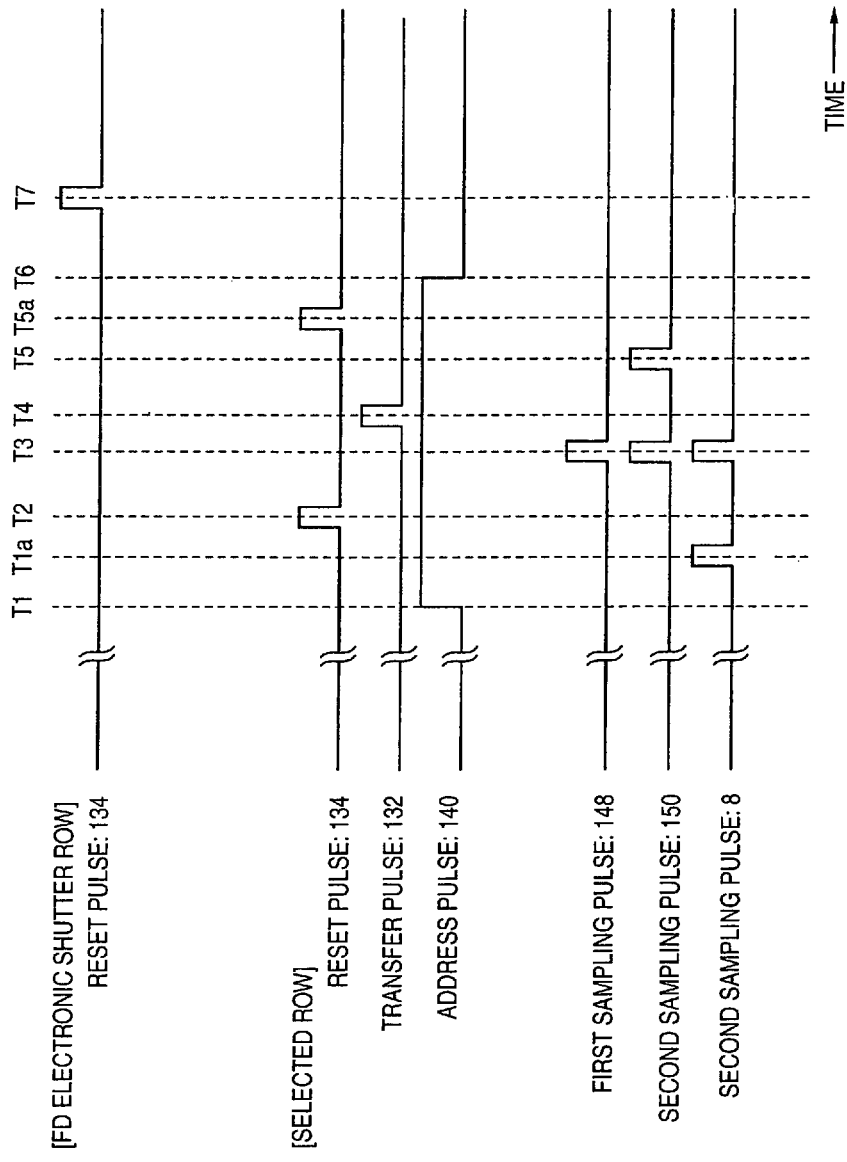
FIG. 22 is a timing chart showing an operation of a pixel part shown in FIG. 21.

FIG. 20 is a block diagram showing one example of a solid-state image sensing apparatus according to the eighth embodiment of this invention, FIG. 21 is a circuit diagram showing a pixel periphery which configures a solid-state image sensing apparatus shown in FIG. 20, FIG. 22 is a timing chart showing an operation which relates to a pixel of FIG. 21. In FIG. 20, FIG. 21, the same reference numerals and signs are given to the same elements as in FIG. 28, FIG. 29, and detail explanations regarding those will be omitted here. Hereinafter, with reference to these drawings, one example of a solid-state image sensing apparatus according to the eighth embodiment of this invention will be explained, and at the same time, an embodiment of a driving method of a solid-state image sensing apparatus according to this invention will be explained.

As shown in FIG. 20, FIG. 21, the solid-state image sensing apparatus 1 according to this embodiment, in addition to the structure shown in FIG. 2, includes a shutter•gain control circuit 52 and a communication part 54. The shutter•gain control circuit 52, on the basis of a signal from the communication part 54, outputs a gain control signal 52A to output parts 16, 118A, and outputs to the V selection means 106 a shutter control signal 52B which relates to reset of a floating diffusion part 124 which will be explained later in detail.

The communication part 54 receives through a terminal 2D from outside, a signal for controlling gain of the output parts 16, 118A and a signal for designating timing of reset of the floating diffusion part 124, and supplies them to the shutter•gain control circuit 52. The communication part 54 also, receives a signal which represents gain of the output parts 16, 118A, and a signal which relates to timing of reset of the floating diffusion part 124, and outputs them through a terminal 2C to an outside of the solid-state image sensing apparatus 1 as a digital signal. Further, in this embodiment, the communication part 54 receives also a signal for controlling a basic clock cycle etc. of the timing generator 6 from an outside of the solid-state image sensing apparatus 1 through a terminal 2D, and supplies it to the timing generator 6.

In passing, the first voltage generation means which relates to this invention is configured by including the floating diffusion part 124 which was disposed adjacent to the photo diode 122 on a semiconductor substrate, and the second voltage generation means is configured by including the photo diode 122 and the floating diffusion part 124.

Also, the first signal output means which relates to this invention is configured by including the address gate 138, the vertical signal line 136, the S/H•CDS part 112, the output part 118A, the terminal 2B, and the timing generator 6 and the V selection means 106 as the first timing control means, and the second signal output means is configured by including the address gate 138, the vertical signal line 136, the S/H•CDS part 10, the output part 16, the terminal 2A, and the timing generator 6 and the V selection means 106 as the second timing control means.

And, the sensitivity control means which relates to this invention is configured by including the reset gate 128, the shutter•gain control circuit 52, and the timing generator 6 and the V selection means 106 as the third timing control means, and the third and fourth signal output means are configured by including the shutter•gain control circuit 52, the communication part 54, and the terminal 2C.

Next, an operation of the solid-state image sensing apparatus 1 of this embodiment will be explained with also reference to FIG. 22. In passing, in FIG. 22, the same reference numerals and signs are given to timings which correspond to the timings shown in FIG. 3.

The V selection means 106, on the basis of timing pulses from the timing generator 6, selects a pixel row of the pixel region 104, and outputs the address pulse 140 (high level) at timing T1, to the pixel 120 which belongs to the selected row. This address pulse 140 is supplied to the address gate 138 in each pixel 120, and as a result, the address gate 138 is turned ON and the amplifying transistor 130 is connected to the vertical signal line 136. At this time, since the amplifying transistor 130 forms a source follower circuit together with the constant current source 114, a gate voltage, i.e., a voltage which followed a voltage of the FD part 124 is outputted from the amplifying transistor 130 to the vertical signal line 136 with low impedance.

After that, the timing generator 6 operates as second timing control which relates to this invention, and at timing T1a, to the S/H•CDS part 10, outputs a second sampling pulse 8, and has a voltage of the FD part 124 which is outputted through the amplifying transistor 130 to the vertical signal line 136, i.e., a second voltage (hereinafter, also referred to a wide D voltage) which relates to this invention (second timing control step which relates to this invention), held. As to what-like voltage the voltage which was held here is, it will be explained later in detail.

Next, the V selection means 106 outputs the reset pulse 134 at timing T2, and by this, the reset gate 128 is turned ON and the FD part 124 is connected to the electric source Vdd, and signal charges which are stored in the FD part 124 are excluded. And, a voltage of the FD part 124 in this reset state, i.e., the offset voltage is outputted from the amplifying transistor 130 to the vertical signal line 136.

Subsequently, at timing T3, the timing generator 6 outputs the first and second sampling pulses 148, 150 to the S/H•CDS circuit 146A which were disposed with respect to each vertical signal line 136, and outputs the first sampling pulse 148 and the second sampling pulse 8 to the S/H•CDS circuit 4A, respectively, and has the above-described offset voltage, which was outputted by the amplifying transistor 130 to the vertical signal lien 136, held.

After that, at timing T4, the V selection means 106 outputs the transfer pulse 132, and has the transfer gate 126 turned ON, and has signal charges, which were stored due to light reception of the photo diode 122 after the previous transfer pulse 132 until the timing T4, transferred to the FD part 124. The FD part 124 generates a voltage which corresponded to an amount of signal charges transferred, i.e., a normal light detection voltage (first voltage which relates to this invention), and the amplifying transistor 130 outputs its voltage to the vertical signal line 136 with low impedance.

And, the timing generator 6, at timing T5, outputs the second sampling pulse 150 to each S/H•CDS circuit 146A which was disposed with respect to each vertical signal line 136, and at this time, has the above-described normal light detection voltage, which the amplifying transistor 130 outputs to the vertical signal line 136, held. By this, each S/H•CDS circuit 146A calculates a difference of the normal light detection voltage held as above and the offset voltage, and removes the offset portion, and outputs a voltage of a size which corresponds to the amount of incident light to the photo diode 122. Output signals of the S/H•CDS circuit 146A with respect to each vertical signal line 136 are sequentially selected by the H selection means 108 on the basis of timing pulses from the timing generator 6, and outputted to the horizontal signal line 116, and outputted as a normal image signal from the terminal 2B through the output part 118A.

Here, gain of the output part 118A is set by the gain control signal 52A from the shutter•gain control circuit 52, and the shutter•gain control circuit 52, in this embodiment, generates this gain control signal 52A on the basis of a signal which is inputted from outside through the terminal 2D and supplied through the communication part 54. Also, the shutter•gain control circuit 52 outputs a signal which represents gain of the output part 118A to the communication part 54, and the communication part 54 outputs this signal to outside through the terminal 2C.

On one hand, in the S/H•CDS part 10, the S/H•CDS circuit 4A which was disposed with respect to each vertical signal line 136 calculates a difference of the wide D voltage held as described above and the offset voltage, and removes the offset portion, and outputs a voltage of a size which corresponds to an amount of incident light to the photo diode 122. Output signals of the S/H•CDS circuit 4A with respect to each vertical signal line 136 are sequentially selected by the H selection means 12 on the basis of timing pulses from the timing generator 6, and outputted to the horizontal signal line 14, and outputted from the terminal 2A as wide D image signals through the output part 16.

Here, gain of the output part 16 is set by the gain control signal 52A from the shutter•gain control circuit 52, and the shutter•gain control circuit 52, in this embodiment, generates this gain control signal 52A on the basis of a signal which is inputted from outside through the terminal 2D and supplied through the communication part 54. Also, the shutter•gain control circuit 52 outputs a signal which represents gain of the output part 16 to the communication part 54, and the communication part 54 outputs this signal to outside through the terminal 2C.

The V selection means 106, in order to be prepared for a next cycle, at timing T5a, outputs the reset pulse 134 again. By this, the reset gate 128 is turned ON and the FD part 124 is connected to the electric source Vdd, and signal charges which are stored in the FD part 124 are excluded.

The V selection means 106 returns the address pulse 140 to a low level at timing T6, and as a result, the address gate 138 is turned OFF and the amplifying transistor 130 is cut off from the vertical signal line 136, and an operation regarding the pixel 120 which is of 1 row portion is completed.

In the above operations, the V selection means 106 and the timing generator 6 operate as the first timing control means which relates to this invention, and supply the address pulse 140 to a pixel of the selected row at timing T1, and has the FD part 124 reset at timing T2, and has signal charges which the photo diode 122 generated transferred to the FD part 124 at timing T4, and has the normal light detection voltage outputted to the vertical signal line, and, at this time, the first timing control step which relates to this invention is carried out.

Subsequently, the V selection means 106 operates together with the timing generator 6 as the third timing control means which relates to this invention, and to each pixel of a pixel row (FD electronic shutter row) which was advanced by 5 rows as one example, from the selected row which was selected until timings T1-T6, at timing T7, the reset pulse 134 is outputted, and the FD part 124 is reset (third timing control step which relates to this invention). Here, the V selection means 106 sets the above-described FD electronic shutter row on the basis of the shutter control signal 52B from the shutter•gain control circuit 52, and the shutter•gain control circuit 52, in this embodiment, generates the shutter control signal 52B on the basis of a signal which is inputted from outside through the terminal 2D and supplied through the communication part 54. Also, the shutter•gain control circuit 52 outputs a signal which represents the number of rows from a currently selected row up to the FD electronic shutter row to the communication part 54 as a sensitivity signal, and the communication part 54 outputs this signal to outside through the terminal 2C.

Figure 23:
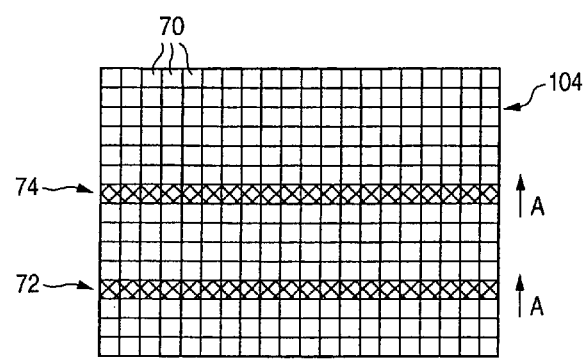
FIG. 23 is an explanatory view showing a relation of an FD electronic shutter row and a selected row in the solid-state image sensing apparatus shown in FIG. 20.

FIG. 23 is an explanatory view showing a relation of the FD electronic shutter row and the selected row, and shows the pixel region 104 schematically, and each quadrangle 70 represents each pixel. And, for example, the selected row 72 is a row which was selected until the above-described timings T1-T6, and the FD electronic shutter row 74 is a row through which the reset pulse 134 is supplied to the FD part 124 of each pixel as described above, at timing T7.

Here, the FD electronic shutter row 74 is selected after 4 rows following the selected row 72 were selected, and becomes the selected row, and in this selected row (FD electronic shutter row 74), the same operation as the operation regarding the selected row 72 which was carried out in the above-described timings T1-T6 is carried out. Therefore, to reset the FD part 124 which configures a pixel of the FD electronic shutter row 74 at timing T7 means to reset the FD part 124 of each pixel of this pixel row, in advance of the pixel row (FD electronic shutter row 74) being later selected by the V selection means 106.

The above-described operations regarding the selected row 72 and the FD electronic shutter row 74 are carried out over sequentially shifting the selected row 72 and the FD electronic shutter row 74 in a direction of an arrow A one row by one row, and when the V selection means 106 selected all rows, image signals which are of one sheet portion which were generated by all pixels 120 are to be outputted.

Next, the above-described wide D voltage which was sampled at timing T1a, and reset of the FD part 124 in the above-described FD electronic shutter row 74 will be explained in detail.

In case that the amount of incident light to the photo diode 122 is large, the photo diode 122 generates signal charges over an amount which can be stored in the photo diode 122, and this excessive signal charges overrun the transfer gate 126 and overflow into the FD part 124, and further, they also overflow the FD part 124, and the signal charges overrun the reset gate 128 and flow into the electric source Vdd.

At this time, a voltage of the FD part 124 is determined by a size of a current due to signal charges which flow out to the electric source Vdd, but the amount of signal charges which the photo diode 122 generates is small, and a current flowing through a channel of the reset gate 128 which is composed of a MOSFET is a weak current with an order of nano ampere or less, and the reset gate 128 operates in the sub-threshold region, and therefore, the voltage of the FD part 124 becomes a value which corresponded to logarithm of a current value. And, since this voltage of the FD part 124 is outputted through the amplifying transistor 130, and supplied to the S/H•CDS circuit 4A, in case that the amount of incident light is excessive, at timing T1a, the wide D voltage which the S/H•CDS circuit 4A holds becomes a value which corresponded to logarithm of the amount of incident light.

However, in this embodiment, the FD part 124 of each pixel of the FD electronic shutter row 74, as described above, in advance of being selected, is reset in advance at a stage of 5 rows before. Therefore, after reset of the FD part 124, signal charges which were overflowed from the photo diode 122 are gradually stored in the FD part 124, but in a stage that the selected row was shifted by 5 rows, the wide D voltage of a size which was in proportion to the amount of signal charges which were stored in the FD part 124 during this period is taken in the S/H•CDS circuit 4A. In this manner, in this embodiment, since electric charge storage time in the FD part 124 is controlled and shortened, even in case that the amount of incident light is excessive and signal charges from the photo diode 122 overflowed, it is possible to obtain a voltage (wide D voltage) which varies linearly to the amount of overflowed signal charges.

Thus, by generating image signals by use of signals which the S/H•CDS circuit 146A generates with the above-described normal light detection voltage and which are outputted through the output part 118A in case that the amount of incident light is of a normal size, and by use of signals which the S/H•CDS circuit 4A generates with the wide D voltage and which are outputted from the output part 16 in case that the amount of incident light is excessive, it is possible to obtain image signals which vary in size linearly to the amount of incident light even in case that the amount of incident light is excessive, and shooting with a wide dynamic range becomes possible.

In passing, when the amount of incident light is further greater, signal charges which overflowed from the photo diode 122 overflow in a stage before timing T1a also in the FD part 124 after reset, and as described above, flow through the reset gate 128, and therefore, the wide D voltage becomes a value which corresponded to logarithm of the amount of incident light. Therefore, the image signals which vary in size proportionally to the amount of incident light are not obtained but, image signals with a size which corresponded to the amount of incident light are obtained, and also in this case, shooting with a wide dynamic range becomes possible.

And, in this embodiment, a normal image signal is outputted from the terminal 2B, and a wide D image signal is outputted from the terminal 2A to outside, respectively, and through the terminal 2C, a signal which represents the number of rows from the selected row up to the FD electronic shutter row, i.e., a sensitivity signal, and a signal which represents gain of the output part are outputted. Therefore, by use of the sensitivity signal and the gain signal, it is possible to combine the normal image signal and the wide D image signal freely and accurately in an outside of the solid-state image sensing apparatus 1 so as to generate image signals, and high flexibility is obtained in utilization of the wide D image signal, and it is possible to realize a solid-state image sensing apparatus with excellent versatility.

For example, on the occasion of combining the wide D image signal and the normal image signal, it is possible to take hold of what-like sensitivity the wide D image signal was generated with, by the sensitivity signal, and it is possible to know gain of the output part 16 by the gain signal, and therefore, it is possible to correctly set what-like percentage the wide D image signal is combined to the normal image signal.

And, for example, it is possible to realize such that, in case that it is desired to make an image which strongly represented a bright portion of an object of shooting in particular, percentage of the wide D image signal is set larger, and adversely, in case that it is desired to make an image which represented a bright portion of an object of shooting in a suppressed manner, the percentage of the wide D image signal is set smaller.

Also, in this embodiment, since it is possible to adjust the number of rows from the above-described selected row up to the FD electronic shutter row, therefore, a relation of strength of excessive incident light to the photo diode and a size of the wide D voltage, by the shutter•gain control circuit 52, and it is possible to adjust sensitivity to the excessive incident light, even in case that an object of shooting and shooting conditions are changed and strength of the excessive incident light varies largely, by corresponding flexibly, it is possible to realize so as for a very good image to be obtained at all times.

Also, in this embodiment, as described above, since the wide D image signal and the normal image signal are outputted from the output parts 16, 118A at the same time, it is possible to select to use both outputs, or to use only one, according to need and degree of freedom is high in signal processing of a subsequent stage.

Further, in this embodiment, since combining of the normal image signal and the wide D image signal is carried out externally, it becomes advantages in suppressing a manufacturing cost of the solid-state image sensing apparatus 1. That is, since for example, multimillion pixels are disposed in the pixel region 104, and there is a necessity that all pixels thereof operate correctly, a manufacturing yield of the pixel part becomes one which is relatively low. In case that a signal processing circuit for combining the normal image signal and the wide D image signal was formed on the same semiconductor substrate as the pixel part, even if the signal processing circuit itself is normal, when the pixel part becomes defective, there is no other way than discarding also the signal processing circuit, and the manufacturing yield of the pixel part is low as described above, and therefore, the suchlike waste occurs easily. In this embodiment in which combination of the normal image signal and the wide D image signal is carried out externally, the signal processing circuit is to be formed on a separate semiconductor substrate from the pixel part, and thus, it is advantageous in suppressing a manufacturing cost.

And, there is no necessity of using a line memory, a frame memory, and of carrying out calculation processing between rows of the pixel region 104, a structure and a processing content are simple, which is advantageous to miniaturization of an apparatus, and there occurs no case that a manufacturing cost is particularly increased.

Further, since a structure of the pixel 120 is the same as in the past, there occurs no case that a size of the pixel 120 grows larger, and this point is also advantageous to miniaturization of a solid-state image sensing apparatus.

Also, since a capacitor etc. are not used, there occurs no problem of a residual image, and, since it is possible to use an embedded photo diode 122 with less noises, there also occurs no case that performance is lowered on a point of image quality.

In passing, in this embodiment, as shown in FIG. 23, it was explained that the FD electronic shutter row 74 goes ahead by 5 rows from the selected row 72, but, as described above, by variously changing an interval between these rows under control by the shutter•gain control circuit 52, it is possible to change electric charge storage time in the FD part 124, and it is possible to adjust a range of the amount of light in which the wide D voltage which varies linearly to the amount of incident light can be obtained in case that the amount of incident light is excessive. The narrower the above-described interval between rows is made, the range of the amount of light in which the wide D voltage which varies linearly to the amount of incident light can be obtained is widened, and for example, in case that 1 frame is composed of 500 pixel rows, assuming that the FD electronic shutter row 74 is a next row of the selected row 72, it is expanded 500 times as compared to such a case that reset of the FD part 124 was not carried out by the FD electronic shutter row 74.

And, in this embodiment, it was explained that the shutter•gain control circuit 52, on the basis of a signal which is inputted from outside through the terminal 2D and the communication part 54, generates the shutter control signal 52B and the gain control signal 52A and controls the V selection means 106 and the output parts 16, 118A, but it is of course possible to configure to generate these control signals only by the shutter•gain control circuit 52 without a signal from outside. In that case, for example, it is possible to configure to monitor a size of the wide D image signal and the normal image signal which the output parts 16, 118A output, by the shutter•gain control circuit 52, and to generate the shutter control signal 52B and the gain control signal 52A so as to properly set the above-described FD electronic shutter row and the gains of the output parts 16, 118A.

Also, in this embodiment, it was explained that electrons are carriers, but also, in case that a P type MOSFET is used as a MOSFET which configures each gate etc., and positive holes are made to be carriers, essential operations do not change, and the same operation and effects are obtained.

Here, as a photoelectric conversion device, the photo diode was used, but it is of course possible to use another photoelectric conversion device such as a photo gate etc.

Next, a ninth embodiment of this invention will be explained.

Figure 24:
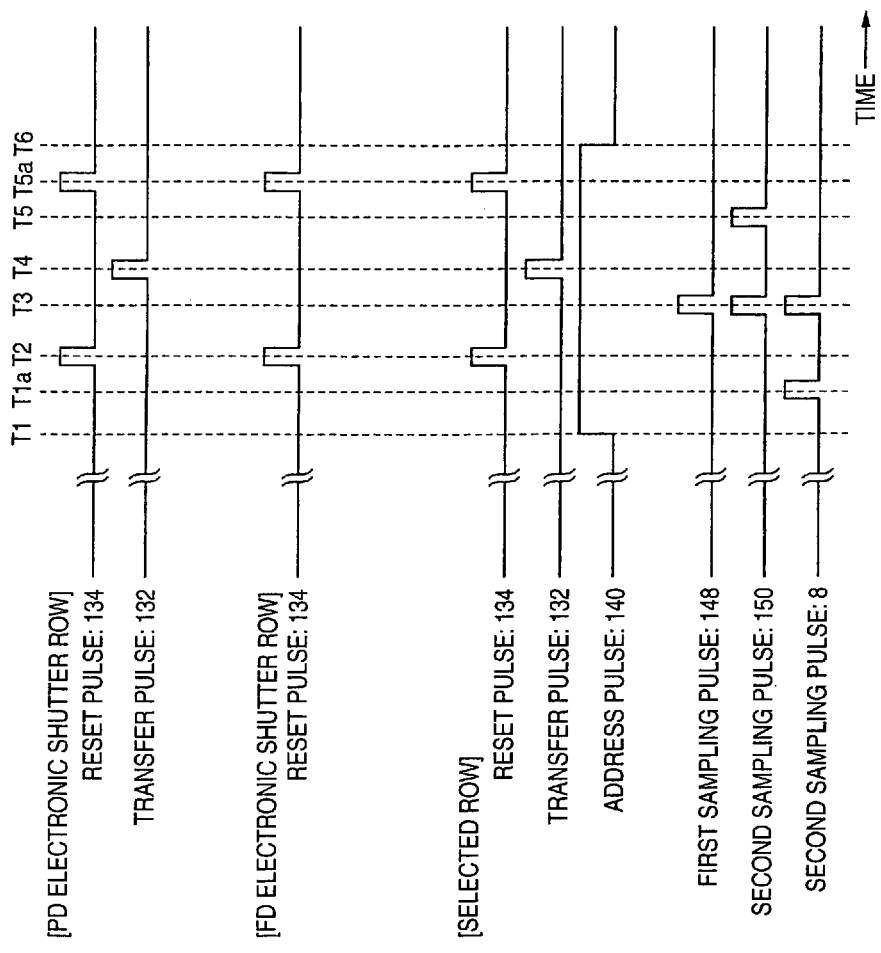
FIG. 24 is a timing chart showing an operation of a ninth embodiment of this invention.
Figure 25:
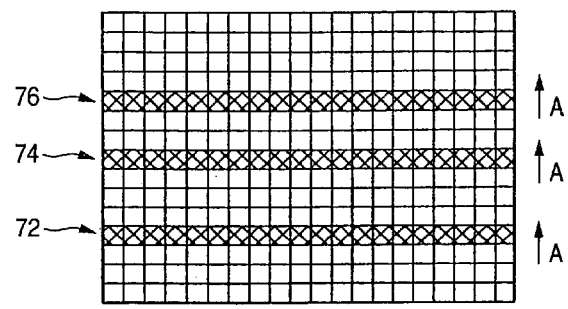
FIG. 25 is an explanatory view showing a relation of a photo diode advance reset row, an FD electronic shutter row, and a selected row in the ninth embodiment shown in FIG. 24.

FIG. 24 is a timing chart showing an operation of this ninth embodiment, and FIG. 25 is an explanatory view showing a relation of the photo diode electronic shutter row, the FD electronic shutter row, and the selected row in this ninth embodiment. In FIG. 25, the same reference numerals and signs are given to the same elements as in FIG. 23. Hereinafter, with reference to these drawings, a solid-state image sensing apparatus as the ninth embodiment of this invention will be explained, and another example of a driving method of a slid-state image sensing apparatus of this invention will be explained at the same time.

In passing, since an overall structure of the solid-state image sensing apparatus and a structure of the pixel of this ninth embodiment are the same as those of the solid-state image sensing apparatus 1 of the eighth embodiment, FIG. 20, FIG. 21 are also referred at pleasure.

This ninth embodiment is, as shown in FIG. 25, different from the above-described solid-state image sensing apparatus 1 on such a point that the photo diode electronic shutter row 76 is set together with the FD electronic shutter row 74, and timing control by the timing generator 6 and the V selection means 106 was changed. The FD electronic shutter row 74 is, in this embodiment, in a position which is ahead by 4 rows from the selected row 72, and the photo diode electronic shutter row 76 is in a position which is ahead by 7 rows from the selected row 72.

Here, the V selection means 106 sets the above-described FD electronic shutter row 74 and the photo diode electronic row 76 on the basis of the shutter control signal 52B from the shutter•gain control circuit 52, and the shutter•gain control circuit 52, in this embodiment, generates the shutter control signal 52B on the basis of a signal which is inputted from outside through the terminal 2D and supplied through the communication part 54. Also, the shutter•gain control circuit 52 outputs a signal which represents the number of rows from the currently selected row 72 up to the FD electronic shutter row 74 as a sensitivity signal, and a signal which represents the number of rows from the selected row 72 up to the photo diode electronic shutter row 76 as a second sensitivity signal, to the communication part 54, and the communication part 54 outputs these signals to outside through the terminal 2C.

Explaining as to an operation of this embodiment, the V selection means 106 (FIG. 20) outputs the address pulse 140 (high level) to each pixel of the selected row 72 at timing T1. As a result, the address gate 138 (FIG. 21) is turned ON and the amplifying transistor 130 is connected to the vertical signal line 136.

After that, the timing generator 6 outputs the sampling pulse 8 to the S/H•CDS circuit 4A at timing T1a, and has the wide D voltage which is outputted through the amplifying transistor 130 to the vertical signal line 136, held.

Next, the V selection means 106 outputs the reset pulse 134 to each row of the selected row 72, the FD electronic shutter row 74, the photo diode electronic shutter row 76 at timing T2. By this, in each pixel of the above-described 3 rows, the reset gate 128 is turned ON and the FD part 124 is reset. In the selected row 72, a voltage of the FD part 124 in this reset state, i.e., the offset voltage is outputted by the amplifying transistor 130 to the vertical signal line 136.

Subsequently, at timing T3, the timing generator 6 outputs the first and second sampling pulses 148, 150 to the S/H•CDS circuit 146A which was disposed with respect to each vertical signal line 136, and outputs the first sampling pulse 148 and the second sampling pulse 8 to the S/H•CDS circuit 4A, respectively, and has the above-described offset voltage, which was outputted by the amplifying transistor 130 of the selected row 72 to the vertical signal lien 136, held.

After that, at timing T4, the V selection means 106 supplies the transfer pulse 132 to the transfer gate which configures a pixel of the selected row 72 and the photo diode electronic shutter row 76 so as to have it turned ON, and has signal charges, which were stored due to light reception of the photo diode 122 until this timing, transferred to the FD part 124. The FD part 124 of each pixel of the selected row 72 generates the normal light detection voltage, and the amplifying transistor 130 outputs that voltage to the vertical signal line 136 with low impedance.

And, the timing generator 6, at timing T5, outputs the second sampling pulse 150 to each S/H•CDS circuit 146A, and at this time, has the above-described normal light detection voltage, which the amplifying transistor 130 outputs to the vertical signal line 136, held. By this, each S/H•CDS circuit 146A subtracts the offset voltage from the normal light detection voltage which was held as described above, and outputs a voltage of a size which corresponds to the amount of incident light to the photo diode 122. Output signals of the S/H•CDS circuit 146A with respect to each vertical signal line 136 are sequentially selected by the H selection means 108 on the basis of timing pulses from the timing generator 6, and outputted to the horizontal signal line 116, and outputted as a normal image signal through the output part 118A.

On one hand, in the S/H•CDS part 10, each S/H•CDS circuit 4A subtracts the offset voltage from the wide D voltage which was held as described above, and outputs a voltage of a size which corresponds to the amount of incident light to the photo diode 122. Output signals of each S/H•CDS circuit 4A are sequentially selected by the H selection means 12 on the basis of timing pulses from the timing generator 6, and outputted to the horizontal signal line 14, and outputted as the wide D image signal through the output part 16.

The V selection means 106, in order to be prepared for a next cycle, at timing T5a, outputs the reset pulse 134 again to the selected row 72, the FD electronic shutter row 74, and the photo diode electronic shutter row 76. By this, the reset gate 128 which configures a pixel of each row is turned ON and the FD part 124 is reset. In passing, since the transfer pulse 132 is supplied to a pixel of the photo diode electronic shutter row 76 at timing T4, both of the photo diode 122 and the FD part 124 which configure a pixel of the photo diode electronic shutter row 76 become in a reset state in this stage.

The V selection means 106 returns the address pulse 140 which was supplied to a pixel of the selected row 72 to a low level at timing T6, and as a result, the address gate 138 which configures a pixel of the selected row 72 is turned OFF and the amplifying transistor 130 is cut off from the vertical signal line 136. The V selection means 106, thereafter, carries out the suchlike operation over shifting the selected row 72, the FD electronic shutter row 74, and the photo diode electronic shutter row 76 one row by one row in a direction of an arrow A (FIG. 25) sequentially.

In the above operations, the photo diode electronic shutter row 76 shown in FIG. 25 is selected after 6 rows following the selected row 72 were selected, and becomes a selected row, and in that stage, the same operations as the operations regarding the selected row 72 shown in FIG. 25 which were carried out at the above-described timings T1-T6 are carried out in the photo diode electronic shutter row 76 (new selected row 72). Therefore, at timing T4, to have signal charges of the photo diode 122 transferred to the FD part 124, by supplying the transfer pulse 134 to a pixel of the photo diode electronic shutter row 76 and further, at timing T5a, to reset the FD part 124 by supplying the reset pulse at timing T5a means to reset the photo diode 122 and the FD part 124 of that pixel, in advance of a pixel row (photo diode electronic shutter row 76) being selected by the V selection means 106 later (fourth timing control step which relates to this invention). Here, the V selection means 106 which supplies the transfer pulse and the reset pulse to the photo diode electronic shutter row 76 is operating as the fourth timing control means which relates to this invention together with the timing generator 6.

In this manner, in the ninth embodiment, since the photo diode electronic shutter row 76 is set and the photo diode 122 is reset in advance, the electric charge storage time in the photo diode 122 becomes time which corresponds to the number of rows from the selected row 72 up to the photo diode electronic shutter row 76. Thus, by variously adjusting this number of rows, it is possible to change electric charge storage time in the photo diode 122, and the same advantages can be obtained as in the first embodiment and in addition to that, it becomes possible to carry out adjustment of sensitivity to the amount of incident light with a normal level.

And, in this ninth embodiment, since the above-described second sensitivity signal is also outputted to an outside of the solid-state image sensing apparatus through the terminal 2C, on the occasion of combining the normal image signal and the wide D image signal which are outputted from the terminals 2A, 2B externally, it is possible to effectively utilize this second sensitivity signal.

In passing, in this ninth embodiment, it was configured that the reset pulse 134 is supplied also at timing T2 to a pixel of the FD electronic shutter row 74, but it may be configured such that the reset pulse is not supplied at this timing, and the reset pulse is supplied only at timing T5a, and also in that case, it is possible to reset the FD part 124 in advance, in preparation of the FD electronic shutter row 74 being selected later. Also, as in the case of the first embodiment, it is of course possible to reset the FD part 124 at timing after timing T6.

In this regard, however, on such a point that timing control is applied in common to a pixel of each row of the selected row 72, the FD electronic shutter row 74, and the photo diode electronic shutter row 76, and design is made to be easy, to adopt a system of supplying a reset pulse at the same timing as the selected row 72 etc. to the FD electronic shutter row 74 is advantageous.

Further, in the ninth embodiment, it was configured such that, to a pixel of the photo diode electronic shutter row 76, at the same timing as a pixel of the selected row 72, the reset pulse 134 and the transfer pulse 132 are supplied, but since the suchlike timing control to the photo diode electronic shutter row 76 aims to reset the photo diode 122 and the FD part 124 of the photo diode electronic shutter row 76 in advance, it is of course possible to configure to reset the photo diode 122 and the FD part 124 at timing which is different from that of the selected row 72.

Next, a tenth embodiment of this invention will be explained.

Figure 26:
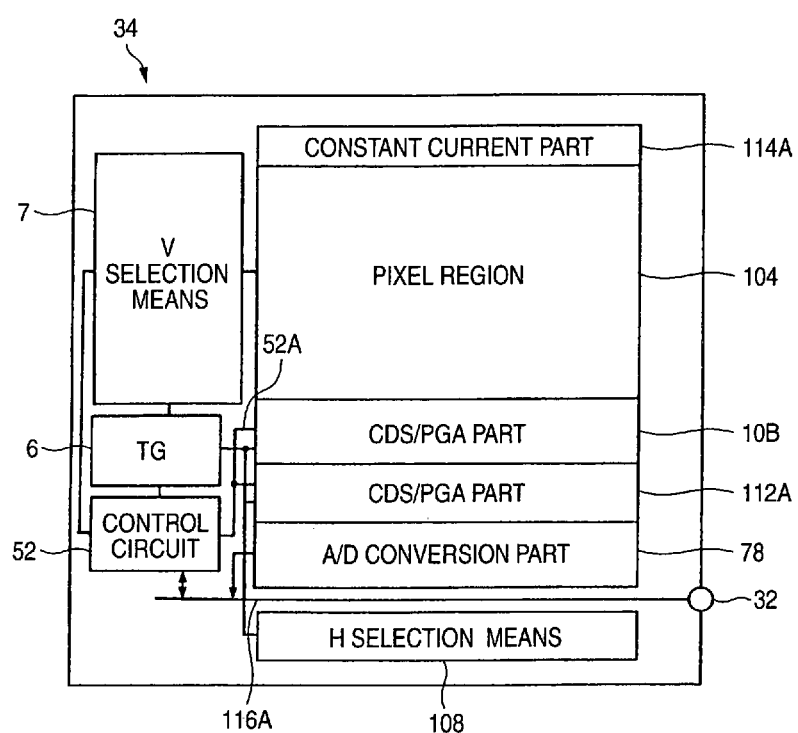
FIG. 26 is a block diagram showing the entirety of a solid-state image sensing apparatus as a tenth embodiment of this invention.

FIG. 26 is a block diagram showing the entirety of a solid-state image sensing apparatus as the tenth embodiment of this invention. In the figure, the same reference numerals and signs are given to the same elements as in FIG. 20.

In the solid-state image sensing apparatus 1 of this embodiment, when it is compared to the solid-state image sensing apparatus 1 shown in FIG. 1, instead of the S/H•CDS parts 10, 112, CDS.PGA parts 10B, 112A are disposed, and also, an A/D conversion part 78 is disposed, and further, the horizontal signal line 116 is substituted by a bus line 116A. On one hand, the communication part 80 is deleted.

The CDS.PGA parts 10B, 112A are ones in which a function of a variable gain amplifying circuit was added to the S/H•CDS parts 10, 112 of FIG. 21, and after the wide D voltage from which the offset portion was removed and the normal light detection voltage were amplified and level adjustment was applied thereto, they are outputted as the wide D image signal and the normal image signal, respectively. Gains of the CDS.PGA parts 10B, 112A are set by the gain control signal 52A which is supplied from the shutter•gain control circuit 52.

The bus line 116A is composed of for example, 10 signal lines, and the terminal 32 is also configured by 10 terminals, and each signal line of the bus line 116A is connected to each terminal of the terminal 32, respectively. Therefore, by the bus line 116A and the terminal 32, a digital signal of 10 bits can be outputted to outside as it is.

The A/D conversion part 78 receives the wide D image signal and the normal image signal from the CDS.PGA parts 10B, 112A and converts them into digital signals, respectively. These digitized wide D image signal and normal image signal are, under control by the H selection means 108, outputted to the bus line 116A in the order of an arrangement of pixels in a row direction and by a time division system, and outputted to an outside of the solid-state image sensing apparatus 34 through the common terminal 32.

Also, in the tenth embodiment, the shutter•gain control circuit 52 generates the shutter control signal 52B and the gain control signal 52A by itself without receiving control from outside, and outputs them to the V selection means 106 and the CDS.PDA parts 10B, 112A. More concretely, the shutter•gain control circuit 52 takes therein the normal image signal and the wide D image signal which are outputted from the A/D conversion part 78 to the bus line 116A, and on the basis of its size, generates the shutter control signal 52B and the gain control signal 52A so as to properly set the above-described FD electronic shutter row and gains of the CDS.PGA parts 10B, 112A.

FIG. 27A through FIG. 27D are timing charts showing output timings of the image signal, the sensitivity signal and the gain signal in this tenth embodiment. In passing, the sensitivity signal is a signal which represents the number of rows from the currently selected row up to the FD electronic shutter row as described above, and the gain signal is a signal which represents gains of the CDS/PGA parts 10B, 112A.

As shown in FIG. 27A, image signals for 1 screen portion (normal image signal and wide D image signal) which are generated from a light detection result of all pixels which were disposed in the pixel region 104 are outputted periodically and repeatedly in accordance with timings which the timing generator 6 defines. This cycle is Tv, and image signals Vsf for 1 screen portion are outputted from a period Ts in Tv. A head part of the period Tv is a vertical blanking period Tbv, and the shutter•gain control circuit 52 outputs the digitized sensitivity signal and gain signal Sp to the bus line 116A so as to output them to outside through the terminal 32, on the basis of timing pulses from the timing generator 6, in a partial period in this vertical blanking period Tbv. That is, in this embodiment, the image signal Vsf and the sensitivity signal and gain signal are outputted to outside through a common output terminal in a time division manner.

The image signals for 1 screen portion shown in FIG. 27A are, for details, a continuation of image signals which were generated from pixels for 1 row portion as shown in FIG. 27B by having expanded a part thereof, and image signals Vsh for pixel 1 row portion are outputted to the bus line 116A with a cycle of Th.

Figure 27:
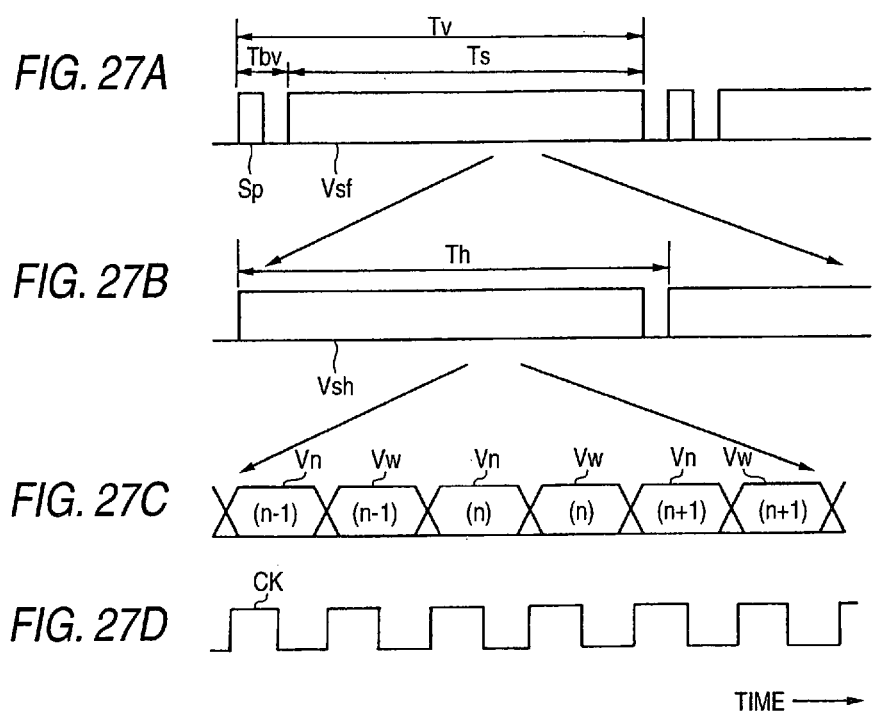
FIGS. 27A through FIG. 27D are timing charts showing an operation of a pixel part in the solid-state image sensing apparatus shown in FIG. 26.

Further, the image signals Vsh for each 1 row portion become, as shown in FIG. 27 by having expanded a part thereof, one that image signals which were generated by each pixel are disposed in the order of an arrangement of pixels in a row direction. In this embodiment, the normal image signal Vn and the wide D image signal Vw which were generated in each pixel are outputted to the bus line 116A in a time division manner, in synchronous with clocks CK from the timing generator shown in FIG. 27D, under control by the H selection means 108 as described above. In FIG. 27C, a positive integer n represents a number of a pixel in a row direction.

In the suchlike tenth embodiment, effects similar to those of the eighth embodiments are obtained. In addition, since the normal image signal, the wide D image signal, the sensitivity signal, and the gain signal are all outputted to outside from the terminal 32, even in case of outputting each signal to outside as a digital signal as in this embodiment, there occurs no problem even if the number of terminals is small, which is advantageous to reduction of a manufacturing cost, and miniaturization of a solid-state image sensing apparatus.

Also, in case that the time division system is not adopted and the normal image signal and the wide D image signal were outputted to outside through different bus lines and different terminals, respectively, in general interconnection lengths are different to each other in both signals, and therefore, signal delays become different ones to each other, and therefore, there occurs a problem of a phase alignment of clocks. However, as in this embodiment, in case that the normal image signal and the wide D image signal were outputted through the common bus line 116A and the terminal 32 by a time division system, there occurs no suchlike problem.

In passing, in the tenth embodiment, it was explained that the bus line 116A is configured by 10 signal lines as one example, it is possible to configure such that the bus line 116A is configured by one signal line, and for example, each bit of 10 bit normal image signal and wide D image signal is also outputted serially by a time division system, and in case that the suchlike structure was realized, it is possible to make the number of terminals to be one.

As explained above, in the eighth-tenth embodiments of this invention, the first voltage generation means generates the first voltage on the basis of the signal charges which were generated due to light reception of the photoelectric conversion device and stored in the photoelectric conversion device, and the first signal output means outputs this first voltage to outside. Also, the second voltage generation means generates the second voltage which corresponds to strength of an incident light when it received the incident light which is stronger than such an incident light that the first voltage which is generated by the first voltage generation means is saturated, and the second signal output means outputs this second voltage to outside. Therefore, even in case that a difference between a bright portion and a dark portion in an object of shooting is large, by use of the second voltage together with the first voltage, it is possible to properly generate an image, and shooting with a wide dynamic range becomes possible.

And, in this invention, by the first signal output means, the first voltage is outputted to outside and by the second and third signal output means, the second voltage and the sensitivity signal are outputted to outside, respectively. Therefore, at an outside of the solid-state image sensing apparatus, by use of these first and second voltages and the sensitivity signal, corresponding to various shooting conditions, it is possible to freely and accurately carry out signal processing and to generate good images, and it is possible to realize a solid-state image sensing apparatus with high flexibility, excellent versatility and a wide dynamic range.

Further, in this embodiment, since combining of the first and second voltages is carried out externally, it becomes advantages in suppressing a manufacturing cost of a solid-state image sensing apparatus. That is, by forming a signal processing circuit for combining the first and second voltages on a semiconductor substrate which is different from that of a pixel part whose manufacturing yield is relatively low, it is possible to avoid a waste of destroying also the signal processing circuit because of a failure of a pixel part as in case that they were formed on the same semiconductor substrate, and it is possible to suppress a manufacturing cost.

And, there is no necessity of using a line memory, a frame memory, and of carrying out calculation processing between rows of pixel rows, a structure and a processing content are simple, which is advantageous to miniaturization of an apparatus, and there occurs no case that a manufacturing cost is particularly increased.

Further, since a structure of the pixel is essentially the same as in the past, there occurs no case that a size of the pixel grows larger, and this point is also advantageous to miniaturization of a solid-state image sensing apparatus.

Also, since a capacitor etc. are not used, there occurs no problem of a residual image, and, since it is possible to use an embedded photo diode with less noises, there also occurs no case that performance is lowered on a point of image quality.

As explained above, in the solid-state image sensing apparatus of this invention, before the first reset pulse is supplied to the first reset gate, an output voltage of the buffer part is taken in the second signal path. In a stage before this first reset pulse is supplied to the reset gate, in case that the amount of incident light to the photoelectric conversion device is large, electric charges which the photoelectric conversion device generated overflow from the photoelectric conversion device and flow into the charge voltage conversion part, and further they also overflow in the charge conversion part and flow out to a predetermined electric potential point.

At this time, a voltage of the electric charge voltage conversion part is determined by a size of a current due to electric charges flown out to the predetermined electric potential point, but since the reset gate has a small current flowing in a channel and operates in a sub-threshold region, a voltage of the electric charge voltage conversion part becomes a value which corresponded to logarithm of a current value. And, since a voltage of the electric charge voltage conversion part is outputted through buffer part, and supplied to the second signal path, in case that the amount of incident light is large, a voltage which is supplied to the second signal path becomes a value which corresponded to logarithm of the amount of incident light.

That is, in the solid-state image sensing apparatus of this invention, in case that the amount of incident light of the photoelectric conversion device is large, a voltage which corresponded to logarithm of the amount of incident light is outputted from the second signal path, and thus, it is possible to realize a solid-state image sensing apparatus with a wide dynamic range.

Also, in the driving method of the solid-state image sensing apparatus of this invention, before the reset pulse is supplied to the reset gate, it is taken in the output voltage of the buffer part. In a stage before this reset pulse is supplied to the reset gate, in case that an amount of incident light to the photoelectric conversion device is large, electric charges that the photoelectric conversion device generated overflow from the photoelectric conversion device and flow into the charge voltage conversion part, and further, they also overflow in the charge voltage conversion part, and flow out to the predetermined electric potential point.

At this time, a voltage of the charge voltage conversion part is determined by a size of a current due to electric charges which flow out to the predetermined electric potential point, but since the reset gate has a small current flowing through a channel and operates in a sub-threshold region, a voltage of the charge voltage conversion part becomes a value which corresponded to logarithm of a current value. And, since a voltage of the charge voltage conversion part is outputted through the buffer part, and supplied to the second signal path, in case that the amount of incident light is large, this voltage becomes a value which corresponded to logarithm of the amount of incident light.

That is, in the driving method of the solid-state image sensing apparatus according to this invention, in case that the amount of incident light of the photoelectric conversion device is large, a voltage which corresponded to logarithm of the amount of incident light is outputted, and thus, it is possible to realize a solid-state image sensing apparatus with wide dynamic range.

Also, in the solid-state image sensing apparatus of this invention, before the charge voltage conversion part is reset by control of the first timing control means at the first timing, by control of the second timing control means, the second voltage which the charge voltage conversion part is generating is outputted through the buffer part. Also, the charge voltage conversion part is reset previously, in advance of the first timing, under control by the third timing control means. Therefore, the second voltage is such a voltage that, in case that the amount of incident light is excessive, after the charge voltage conversion part was reset by control of the third timing control means, excessive signal charges which the photoelectric conversion device generated overflow and are moved to and stored in the charge voltage conversion part, and as a result, the charge voltage conversion part generated.

That is, in the solid-state image sensing apparatus of this invention, even in case that the amount of incident light is excessive and signal charges which the photoelectric conversion device generated overflowed from the photoelectric conversion device to the charge voltage conversion part, a voltage which linearly changes to an amount of overflowed signal charges is generated by the charge voltage conversion part, and outputted as a second voltage. Thus, in case that the amount of incident light is of a normal size, by use of the first voltage, and in case that the amount of incident light is excessive, by use of the second voltage, image signals are generated, and thereby, even in case that the amount of incident light is excessive, it is possible to obtain image signals which change in size linearly to the amount of incident light, and shooting with wide dynamic range becomes possible.

Also, in the driving method of the solid-state image sensing apparatus of this invention, before the charge voltage conversion part is reset by control of the first timing control step in the first timing, by control due to the second timing control step, the second voltage which the charge voltage conversion part is generating is outputted through the buffer part. Also, the charge voltage conversion part is reset previously, in advance of the first timing, under control due to the third timing control step. Therefore, the second voltage is such a voltage that, in case that the amount of incident light is excessive, after the charge voltage conversion part was reset by control of the third timing control step, excessive signal charges which the photoelectric conversion device generated overflow and are moved to and stored in the charge voltage conversion part, and as a result, the charge voltage conversion part generated.

That is, in the driving method of the solid-state image sensing apparatus of this invention, even in case that the amount of incident light is excessive and signal charges which the charge voltage conversion part generated overflowed from the photoelectric conversion device to the charge voltage conversion part, a voltage which charges linearly to an amount of the overflowed signal charges is generated by the charge voltage conversion part, and outputted as the second voltage. Thus, in case that the amount of incident light is of a normal size, by use of the first voltage, and in case that the amount of incident light is excessive, by use of the second voltage, image signals are generated, and thereby, even in case that the amount of incident light is excessive, it is possible to obtain image signals which change in size linearly to the amount of incident light, and shooting with a wide dynamic range becomes possible.

Also, in the solid-state image sensing apparatus of this invention, the first voltage generation means generates the first voltage on the basis of the signal charges which were generated due to light reception of the photoelectric conversion device and stored in the photoelectric conversion device, and the first signal output means outputs this first voltage to outside. Also, the second voltage generation means generates the second voltage which corresponds to strength of an incident light when it received the incident light which is stronger than such an incident light that the first voltage which is generated by the first voltage generation means is saturated, and the second signal output means outputs this second voltage to outside. Therefore, even in case that a difference between a bright portion and a dark portion in an object of shooting is large, by use of the second voltage together with the first voltage, it is possible to properly generate an image, and shooting with a wide dynamic range becomes possible.

And, in the solid-state image sensing apparatus of this invention, by the first signal output means, the first voltage is outputted to outside and by the second and third signal output means, the second voltage and the sensitivity signal are outputted to outside, respectively. Therefore, at an outside of the solid-state image sensing apparatus, by use of these first and second voltages and the sensitivity signal, corresponding to various shooting conditions, it is possible to freely and accurately carry out signal processing and to generate good images, and it is possible to realize a solid-state image sensing apparatus with high flexibility, excellent versatility and a wide dynamic range.

Also, in the driving method of the solid-state image sensing apparatus of this invention, the first voltage generation means generates the first voltage on the basis of the signal charges which were generated due to light reception of the photoelectric conversion device and stored in the photoelectric conversion device, and the first signal output step outputs this first voltage to outside. Also, the second voltage generation means generates the second voltage which corresponds to strength of an incident light when it received the incident light which is stronger than such an incident light that the first voltage which is generated by the first voltage generation means is saturated, and the second signal output step outputs this second voltage to outside. Therefore, even in case that a difference between a bright portion and a dark portion in an object of shooting is large, by use of the second voltage together with the first voltage, it is possible to properly generate an image, and shooting with a wide dynamic range becomes possible.

And, in the driving method of this invention, by the first signal output step, the first voltage is outputted to outside and by the second and third signal output steps, the second voltage and the sensitivity signal are outputted to outside, respectively. Therefore, at an outside of the solid-state image sensing apparatus, by use of these first and second voltages and the sensitivity signal, corresponding to various shooting conditions, it is possible to freely and accurately carry out signal processing and to generate good images, and it is possible to realize a solid-state image sensing apparatus with high flexibility, excellent versatility and a wide dynamic range.

The invention claimed is:

1. A solid-state image sensing apparatus comprising:
   a pixel unit having a photoelectric conversion part, a charge voltage conversion part for generating a voltage of a size which corresponds to an amount of electric charge, a transfer part for connecting said photoelectric conversion part to said charge voltage conversion part, a reset part for connecting said charge voltage conversion part to a predetermined electric potential, and a buffer part for outputting a voltage of said charge voltage conversion part;
   a pixel driving unit for supplying a transfer pulse to a gate of said transfer part and supplying a reset pulse to a gate of said reset part; and
   a signal processing unit for processing an output voltage of said buffer part before said reset pulse is supplied to said reset gate, as a first light detection voltage by said photoelectric conversion device, and processing an output voltage of said buffer part after said transfer pulse is supplied to said transfer gate as a second light detection voltage by said photoelectric conversion device;
   wherein when an amount of incident light is relatively large, electric charges overflow the reset gate and flow into an electric source and an output is sampled providing a signal which corresponds to a logarithm of the amount of incident light, and further wherein when the photoelectric conversion device is not saturated an output whose signal level varies in proportion to the amount of incident light is selectively provided and when the photoelectric conversion device is saturated, an output is selectively provided corresponding to the logarithmic relationship to the amount of incident light.

2. The solid-state image sensing apparatus as set forth in claim 1, characterized by having sample hold means for holding said second light detection voltage.

3. The solid-state image sensing apparatus as set forth in claim 2, characterized by having first sample hold means for holding an output voltage of said buffer part after said first reset pulse is supplied to the reset gate, and second sample hold means for holding said first light detection voltage, and by having first calculation means for calculating a difference of voltages.

4. The solid-state image sensing apparatus as set forth in claim 2, characterized by having a pixel region in which a plurality of said pixels are disposed in a matrix shape, and a vertical signal line is disposed with respect to each column of said pixel region, and an output voltage of said buffer part of each pixel is supplied to each sample hold means through said vertical signal line to which that pixel corresponds.

5. The solid-state image sensing apparatus as set forth in claim 1, characterized by having calculation means for calculating a difference of said second light detection voltage and an output voltage.

6. The solid-state image sensing apparatus as set forth in claim 1, characterized by having voltage control means for controlling a voltage of said predetermined electric potential point, and in that, after said buffer part outputs said first light detection voltage, said voltage control means causes said voltage of the predetermined electric potential point to be lowered for a certain period.

7. The solid-state image sensing apparatus as set forth in claim 1, characterized by having a pixel region in which a plurality of said pixels are disposed in a matrix shape, and in that a vertical signal line is disposed for each column of said pixel region, and an output voltage of said buffer part of each pixel when selected is output through said vertical signal line to which that pixel corresponds.

8. The solid-state image sensing apparatus as set forth in claim 1, characterized by having voltage control means for controlling a voltage of said reset gate, and in that said voltage control means sets a voltage of said reset gate in such a period that said buffer part outputs said second light detection voltage higher than a voltage of said reset gate in such a period that said buffer part outputs said first light detection voltage.

9. The solid-state image sensing apparatus as set forth in claim 1, characterized in that the reset pulse is supplied only while an address pulse is being supplied to the pixel unit.

10. The solid-state image sensing apparatus as set forth in claim 1, characterized in that said solid-state image sensing apparatus further includes means for processing an output voltage of said buffer part after said first reset pulse is supplied to said reset gate, as a third light detection voltage,
    in that said solid-state image sensing apparatus takes in signals in the order of said second light detection voltage, said third light detection voltage and said first light detection voltage, and
    in that said second reset pulse is supplied after said first light detection voltage is taken in.

11. A driving method of a solid-state image sensing apparatus having a pixel which includes a photoelectric conversion device, a charge voltage conversion part for generating a voltage of a size which corresponds to an amount of electric charge, a transfer part for connecting said photoelectric conversion device to said charge voltage conversion part when a transfer pulse is supplied, a reset part for connecting said charge voltage conversion part to a predetermined electric potential when a reset pulse is supplied to a reset gate of the reset part, a buffer part for outputting a voltage of said charge voltage conversion part;
    a first detection processing step for processing a voltage which said buffer part outputs subsequent to said transfer pulse as a first light detection voltage,
    a second detection processing step for processing an output voltage of said buffer part before said reset pulse is supplied to said reset gate, as a second light detection voltage and wherein when an amount of incident light is relatively large, electric charges overflow the reset gate and flow into an electric source and an output is sampled which corresponds to a logarithm of the amount of incident light, and further wherein when the photoelectric conversion device is not saturated an output whose signal level varies in proportion to the amount of incident light is selectively provided and when the photoelectric conversion device is saturated, an output is selectively provided corresponding to the logarithmic relationship to the amount of incident light.

12. The driving method of the solid-state image sensing apparatus as set forth in claim 11, characterized in that said first detection processing step processes a voltage which is output from said buffer part, and said second detection processing step processes a voltage which is output from said buffer part.

13. The driving method of the solid-state image sensing apparatus as set forth in claim 12, further characterized in that said solid-state image sensing apparatus has a pixel region in which a plurality of said pixels are disposed in a matrix shape, and a vertical signal line is disposed with respect to each column of said pixel region, and an output voltage of said buffer part of each pixel, when selected, is output through said vertical signal line to which that pixel corresponds, and a first signal path and a second signal path are disposed so as to sandwich said pixel region.

14. The driving method of the solid-state image sensing apparatus as set forth in claim 11, characterized in that said second detection processing step has a sample and hold step for holding said second light detection voltage.

15. The driving method of the solid-state image sensing apparatus as set forth in claim 14, characterized by having a first sample and hold step for holding an output voltage of said buffer part after a first reset pulse is supplied to said reset gate through a first signal path, and a second sample and hold step for holding said first light detection voltage, and having a first calculation step for calculating a difference of voltages which were held by the sample and hold step of said second light detection voltage and said first sample hold step and for generating a voltage which corresponds to the same voltage difference, and a second calculation step for calculating a difference of voltages which were held by said first and second sample hold steps and for generating a voltage which corresponds to the same voltage difference.

16. The driving method of the solid-state image sensing apparatus as set forth in claim 14, characterized by having a pixel region in which a plurality of said pixels are disposed in a matrix shape, and a vertical signal line is disposed with respect to each column of said pixel region, and an output voltage of said buffer part of each pixel is supplied to each sample and hold step through said vertical signal line to which that pixel corresponds.

17. The driving method of the solid-state image sensing apparatus as set forth in claim 11, further characterized by having a calculation step for calculating a difference of said second light detection voltage and an output voltage of said buffer part after a first reset pulse is supplied to said reset gate and generating a voltage which corresponds to the same voltage difference.

18. The driving method of the solid-state image sensing apparatus as set forth in claim 11, characterized by having a voltage control step for controlling a voltage of said predetermined electric potential point, and in that, after said buffer part outputs said first light detection voltage, said voltage control step lowers a voltage of said predetermined electric potential point for a certain period.

19. The driving method of the solid-state image sensing apparatus as set forth in claim 11, characterized by having a voltage control step for controlling a voltage of said reset gate, and in that said voltage control step sets a voltage of said reset gate in such a period that said buffer part outputs said second light detection voltage higher than a voltage of said reset gate in such a period that said buffer part outputs said first light detection voltage.

20. The driving method of a solid-state image sensing apparatus as set forth in claim 11, characterized in that the reset pulse is supplied only while an address pulse is being supplied to the pixel unit.

21. The driving method of a solid-state image sensing apparatus as set forth in claim 11, characterized in that said solid-state image sensing apparatus further includes a third detection processing step for processing an output voltage of said buffer part after a first reset pulse is supplied to said reset gate, as a third light detection voltage, in that said solid-state image sensing apparatus operates in the order of said second detection processing step, said third detection processing step and said first detection processing step, and in that a second reset pulse is supplied after said first light detection processing step is carried out.

* * * * *